United States Patent [19]

Callaghan et al.

[11] Patent Number: 4,551,021

[45] Date of Patent: Nov. 5, 1985

[54] DISCRIMINANT APPARATUS FOR LASER GYROS

[75] Inventors: Stephen P. Callaghan; Timothy J. Callaghan; Harry A. Gustafson, all of Minneapolis, Minn.; Wah L. Lim, Anaheim, Calif.

[73] Assignee: Honeywell Inc., Minneapolis, Minn.

[21] Appl. No.: 353,713

[22] Filed: Mar. 1, 1982

[51] Int. Cl.[4] .............................................. G01C 19/64
[52] U.S. Cl. .................................... 356/350; 356/349; 372/94
[58] Field of Search ................... 356/350, 849; 372/94

[56] References Cited

U.S. PATENT DOCUMENTS

| 4,099,876 | 7/1978 | Dorsman | 356/350 |
| 4,152,071 | 5/1979 | Podgorski | 356/350 |
| 4,320,974 | 3/1982 | Ljung | 356/350 |
| 4,422,762 | 12/1983 | Hutchings et al. | 356/350 |

*Primary Examiner*—Vincent P. McGraw
*Attorney, Agent, or Firm*—Robert A. Pajak

[57] ABSTRACT

A discriminant apparatus for laser angular rate sensors which provides an output signal related to a selected weighted vectorial sum of the coupling of energy between counterpropagating waves traveling about a closed-loop path. The discriminant apparatus is utilized in a closed-loop control system for minimizing the lock-in rate of the sensor and/or maintaining and selecting scale factor linearity.

32 Claims, 13 Drawing Figures

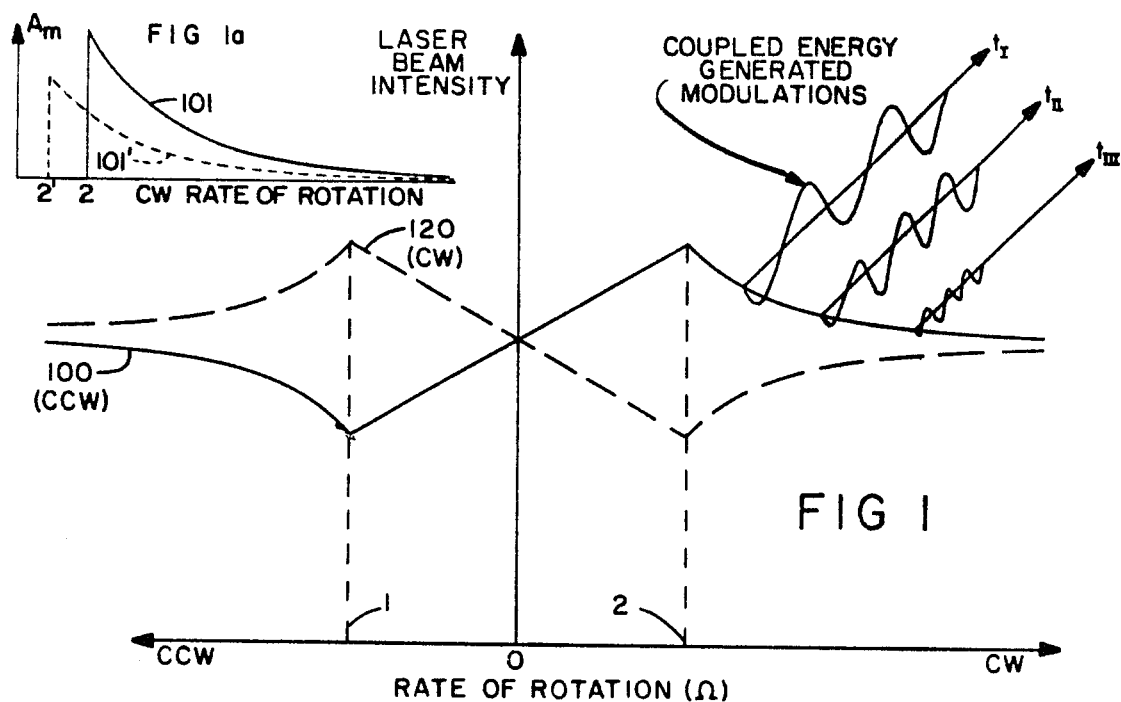
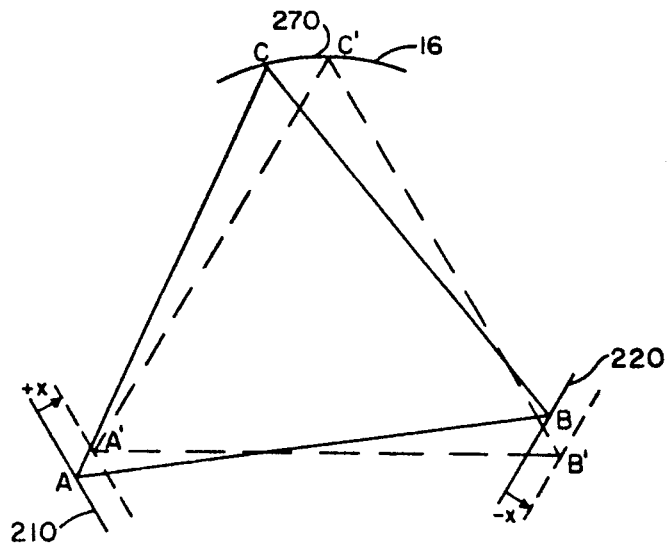

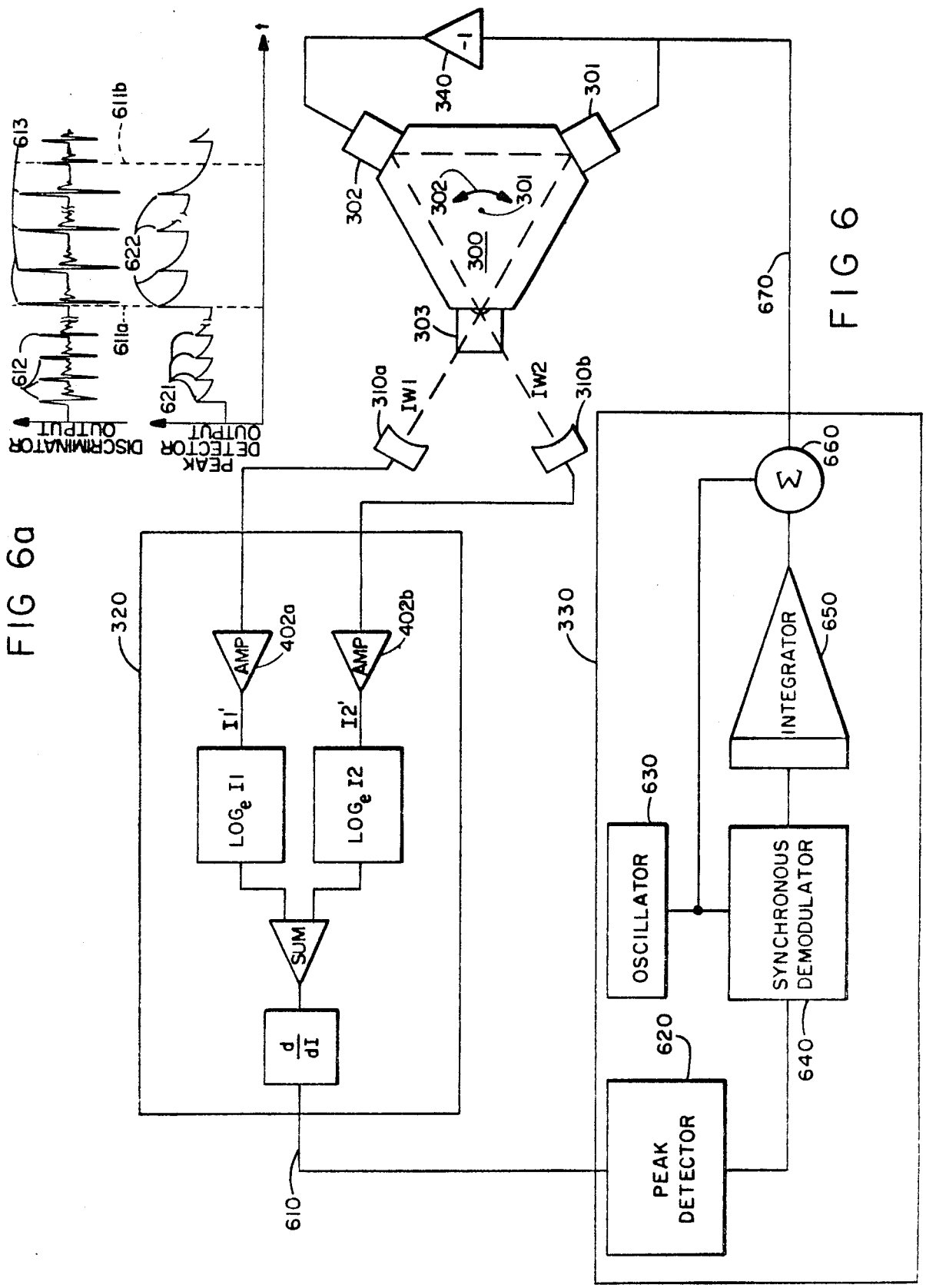

DISCRIMINANT APPARATUS FOR LASER GYROS

Reference is hereby made to a co-pending application by Werner H. Egli, et al., entitled, "Discriminant Apparatus For Laser Gyros," having Ser. No., 353,711, which was filed on even date with the present application and which is assigned to the same assignee as the present application. Reference is also hereby made to U.S. Pat. No. 3,373,650, by J. E. Killpatrick, entitled, "Laser Angular Rate Sensor," and U.S. Pat. No. 4,152,071, by Theodore J. Podgorski, entitled, "Control Apparatus," which also are assigned to the same assignee as the present application. Further, reference is also hereby made to a publication by Frederick Aronowitz and R. Collins entitled, "Lock-in and Intensity-phase Interaction in the Ring Laser," published in the *Journal of Applied Physics,* Vol. 41, No. 1, pp. 130–141, January 1970, and the publication by Fred Aronowitz and Wall L. Lim, entitled, "Positive Scale Factor Correction in the Laser Gyro," published in the *IEEE Journal of Quantum Electronics,* Vol. QE-13, No. 5, May 1977.

The present invention relates to the class of angular rate sensors wherein two waves propagate or travel in opposite directions along a closed-loop path. In particular, the present invention provides an apparatus for altering the coupling of energy along the path traveled by the waves in such a manner so as to reduce the weighted vectorial sum of coupled energy between the counterpropagating waves to a minimum and thereby minimize the lock-in rate, and, improve scale factor linearity and stability.

In a simple laser angular rate sensor, sometimes referred to as a ring laser gyro, two countertraveling waves are usually provided by two waves or beams of substantially monochromatic electromagnetic radiation, usually two monochromatic beams of light. The two light beams are generated so as to travel in opposite directions along a closed-loop path. The length of the closed-loop path, and more importantly, the effective length of the closed-loop path is an integral part of the sensor. The closed-loop path is generally defined by a plurality of vertices formed by reflective surfaces from which impinging waves reflect. Further, the term closed-loop path usually refers to one which is made up of straight line segments. Usually, though not necessarily, the closed-loop path circumscribes a polygon—for example, a triangle, a rectangle, and the like. The closed-loop path may be part of a larger structure such as a cavity formed in a quartz block as taught in U.S. Pat. No. 3,390,606.

The closed-loop path provided in the sensor, typically, though not necessarily, encloses the input axis about which rotation is to be sensed. When the sensor is at rest, the lasing path is identical for the opposite traveling beams resulting in the frequency of oscillation of each beam being identical. Rotation of the ring laser gyro, particularly rotation of the closed-loop path about the input axis, causes the effective lasing path length traveled by one beam to increase, while the effective lasing path length traveled by the other beam to decrease. The resulting effective change in path length for each beam produces a frequency change in each of the beams, one increasing and the other decreasing, since the frequency of oscillation of the beam of electromagnetic radiation in such systems is dependent upon the effective length of the lasing path. The frequency difference between the two beams is therefore indicative of rotation rate of the beams of light, i.e. the rotation rate of the closed-loop path about the input axis.

A bothersome characteristic of the ring laser gyro is "lock-in". At rotation rates about the input axis of the ring laser gyro below some critical value called "lock-in threshold" or "lock-in rate," the frequency of each of the opposite traveling beams synchronize to a common value resulting in the frequency difference being zero indicating no rotation at all. The lock-in characteristic arises due to energy coupling between the opposite traveling waves. Causes of energy coupling between the counterpropagating waves along the closed-loop path include, among others, cavity losses, losses through the gain medium, forward scattering and backscattering. The dominant source of the coupling is thought to be scattering of energy from each of the beams into the direction of the other. A large contributor of scattering of energy is backscattering at the common reflective surfaces forming the vertices of the closed-loop path. However, as the reflective surfaces become better, the remaining causes of energy coupling may become the dominant contributor.

In a laser angular rate sensor, the vertices of the closed-loop path about which the laser beams travel are formed by mirror surfaces. These mirror surfaces may contain mirror imperfections resulting in backscattered waves which are coupled into and become part of the countertraveling waves. These backscattered waves affect the phasing of each of the countertraveling waves in such a manner so as to contribute to the lock-in phenomenon.

The already referred to U.S. Pat. No. 4,152,071, entitled, "Control Apparatus," describes an apparatus to minimize laser angular rate sensor lock-in by optimally altering the closed-loop path traveled by the laser beams by positioning the mirror surfaces forming the vertices of the closed-loop path of the laser cavity. The intensity of one of the counterpropagating waves traveling within the cavity was utilized as a "discriminant" for a closed-loop control system for positioning some of the mirrors forming the vertices of the closed-loop path such as to control the positional relationship of the traveling waves with respect to the mirror surfaces so as to attempt to find an optimum position where the light scattering into a single wave was a minimum which was thought to correspond to a minimum lock-in rate. The techniques for minimizing the lock-in rate described in the just referred to patent, although quite successful on some embodiments of ring laser gyros, were not as successful on others.

SUMMARY OF THE INVENTION

The present invention describes an apparatus for obtaining a useful discriminant for a laser angular rate sensor which is related to a weighted vectorial sum of the coupling of energy between the counterpropagating waves of the sensor. The discriminant can be used to indicate the magnitude of the lock-in rate of a laser angular sensor. The novel discriminant of the present invention when employed in a closed-loop control system can be utilized to alter the path traveled by the sensor's counterpropagating waves so as to alter the weighted vectorial sum of the coupling of energy therebetween the result in a lock-in rate which is minimized. In some situations, the novel discriminant can be employed for stabilizing and/or controlling sensor scale factor linearity.

DESCRIPTION OF THE DRAWINGS

FIG. 1 is a graphical representation of the beam intensity of a laser angular rate sensor for the oppositely traveling waves as a function of the rate of rotation of the sensor.

FIG. 1a is a graphical representation of the amplitude of the coupled energy generated modulation vs. rate.

FIG. 2 is a diagrammatic representation of the positional relationship of the closed-loop path traveled by counterpropagating waves and the reflective surfaces forming the vertices of the closed-loop path.

FIG. 6 is a schematic block diagram showing further details of the closed-loop control system of FIG. 3.

FIG. 6a is a graphical representation of the discriminant signal of FIG. 6.

DETAILED DESCRIPTION OF THE INVENTION

Figure 3:
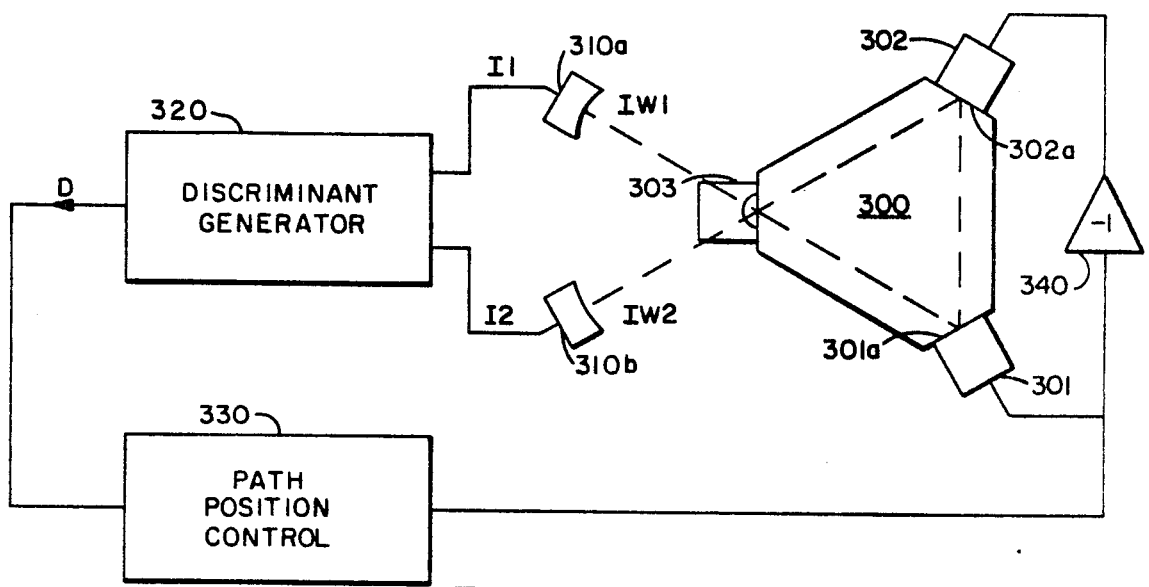
FIG. 3 is a schematic block diagram showing one embodiment of the invention employed in a closed-loop control system for minimizing the lock-in rate of a laser angular rate sensor system.

Some useful characteristics of the counterpropagating waves traveling along the closed-loop path of a laser angular rate sensor were described in U.S. Pat. No. 4,152,071. Shown in FIG. 1 is substantially FIG. 1 shown in U.S. Pat. No. 4,152,071 depicting some useful characteristics of the counterpropagating waves in a ring laser sensor. Referring now to FIG. 1 of the present invention, there shown is a graphical representation of laser beam intensity versus rotation of the closed-loop path of that normally part of a ring laser angular rate sensor. An arbitrarily established counterclockwise laser beam intensity 100 is indicated by the continuous line characteristic, and the oppositely traveling beam, the clockwise beam intensity 120, is shown by the elongated dashed line characteristic. The laser beam intensities described by the characteristic beam intensities 100 and 120 graphically illustrate a phenomenon known as the "winking effect" about the lock-in region where the frequency of the counterpropagating waves lock-in (Aronowitz and Collins).

In FIG. 1, the CCW lock-in rate is indicated at 1 and the CW lock-in rate is indicated at 2, the values thereof generally being substantially equal. The "winking effect" shown by the characteristic intensity 100 for the CCW beam shows that as the rotation rate changes from a high CCW rate to a high CW rate, the laser beam intensity of the single CCW wave drops off as the CCW lock-in rate is approached, 1, and then continually increases in value until the rotation rate of the sensor reaches the CW lock-in rate, 2, at which time the intensity then begins to drop off toward an asymptotic value being substantially the same at the higher rates in the opposite direction. As noted in FIG. 1, the opposite traveling beam indicated by the characteristic beam intensity 120 behaves in an opposite manner as that of the characteristic beam intensity 100.

Associated with the laser beam intensity at values of rotation greater than the lock-in rate, either clockwise or counterclockwise, is a modulation of the beam intensity of each wave at the beat frequency between the two waves, i.e., the frequency difference between the two waves. This modulation or time varying amplitude of the beam intensities at the beat frequency is indicative of the energy coupling between the two counterpropagating waves, the causes of this energy coupling being that as aforesaid. Note that when the beams "lock-in", the modulation is zero.

The intensity modulations at the beat frequency, or harmonics thereof, indicated above, are hereafter referred to as "coupled-energy generated modulations". Associated with the intensity of each of the beams or waves is, therefore, a distinct coupled-energy generated modulation which has both amplitude and phase which can be algebraically or vectorially combined. These coupled energy generated modulations are to be distinguished from those modulations which are induced by external means.

The modulation of the beam intensity of the CCW beam 100 is indicated graphically in FIG. 1 on time axes I, II, and III corresponding to increasing rates of clockwise rotation respectively. A similar modulation occurs for the beam intensity 100 for the opposite rotation direction of the sensor. Further, similar modulations occur for the clockwise wave characteristic beam intensity indicated by line 120 (not shown). It should be noted that the magnitude of the modulations indicated on time axes I, II, and III are not in proportion to the scale of the laser beam intensity shown in FIG. 1 and, in fact, are a gross exaggeration of the magnitude to emphasize the characteristic modulations. In fact, the magnitude of the modulation is indeed quite small relative to the intensity of the laser beam.

An approximate mathematical representation of the laser beam intensity can be described by:

$$I = I_o + A_m \sin \omega_b t \quad (1)$$

where, $\omega_b$ is the beat frequency associated with the frequency difference between the waves at rotation rates above the lock-in rate;

$A_m$ is the amplitude of the coupled energy generated modulations at $\omega_b$ and is inversely proportional to the rotation rate;

Io is the steady state intensity level of the beam without the coupled energy generated modulations.

The first term in equation (1), the steady state intensity Io, is essentially the RMS value derived from laser or gas discharge physics. Each beam or wave of the counterpropagating waves in the ring laser gyro has a frequency and amplitude associated therewith. The frequency is dependent on rotation and the lock-in phenomenon. The amplitude of each of the counterpropagating waves have substantially the same value since they originate in the same gas medium. However, the waves are displaced in phase with each other. The phase displacement is dependent upon the gyro structure and the rotation of the closed-loop path. It is this phase displacement which is indicated when the beams are combined and focused on a detector to form the interference pattern commonly employed to obtain the desired rate information.

On the other hand, the latter term in equation (1) describes the intensity variation or coupled energy modulation associated with the energy coupling between the two waves in the cavity or waveguide. This latter term is superimposed on each of the waves, but it does not grossly affect the phase displacement commonly employed to obtain the rate information as aforesaid. Nevertheless, the latter term does become a source of gyro output error since it does affect the frequency of the laser beams.

For a laser angular rate sensor, the coupled energy generated modulation is indicative of the coupling of one beam into the oppositely traveling beam propagating along the closed-loop path waveguide defined by the mirrors forming the vertices thereof which are common to both beams. As indicated in FIG. 1, and described by equation (1), the amplitude of the coupled energy generated modulation is inversely proportioned to the rotation rate; and the frequency of the coupled energy generated modulation is proportional to the rotation rate since it is a direct function of the beat frequency which is the frequency difference between the two counterpropagating beams in the presence of rotation above the lock-in rate.

Note that the counterpropagating wave characteristics exemplified in FIG. 1 will vary in response to slight variations in the optical path arrangement chosen, for example, slight mirror positional changes. This is illustrated in FIG. 1a. There shown is a graphical representation of the peak amplitude of the coupled energy generated modulations, Am, of equation (1) versus rate of rotation in a clockwise direction only. Of course, similar characteristics occur for the CCW direction. Curve 101 represents coupled energy generated modulation of characteristic 100 for the clockwise direction only. For rotation rates between zero rate and the lock-in rate indicated by numeral 2, there is no modulation since the counterpropagating waves of the sensor are locked in to a common frequency. About the lock-in rate as indicated by numeral 2, an abrupt change takes place since the beams come out of lock-in. At this point, the peak amplitude of the coupled energy generated modulation is a maximum, and the amplitude decreases with increasing rotation rates approaching an asymptotic value.

If the optical path configuration which resulted in characteristic curve 101 is favorably altered to reduce the energy coupling between waves by repositioning one of the mirror surfaces relative to the optical beams, a new characteristic, as indicated by curve 101', may result. As indicated in FIG. 1a, curve 101' is similar in form to curve 101 except a new and lower lock-in rate is established as indicated by numeral 2'. The lower lock-in rate is indicated by a reduced maximum value of amplitude of the coupled energy generated modulation at the new lock-in rate. Further, for each lock-in rate point greater than the lock-in rate indicated by numeral 2, the amplitude of the coupled energy generated modulation indicated by curve 101' is less than the previous characteristic indicated by curve 101. It is important to note that at rotation rates much greater than lock-in rate, a very small coupled energy generated modulation occurs and the value thereof is less in characteristic 101' than characteristic 101 for the same rotation rate. Thus, the amplitude of the coupled energy generated modulation is a very useful parameter for obtaining lock-in rate information. From the characteristic shown in FIG. 1a, it can be seen that the largest difference between values of the amplitude of the coupled energy generated modulation occurs about the lock-in rate point, and therefore is a very good value to detect for control purposes.

The coupled energy generated modulation illustrated in FIG. 1 and described by equation (1) is the basis of the present application. The amplitude and phase of each coupled energy generated modulation superimposed on the intensity of each wave provides information of the energy coupling effects upon the intensity and frequency of each of the counterpropagating waves. In the following discussion, the modulation of each beam intensity at beat frequency caused by energy coupling will be referred to as coupled energy generated modulation so as to distinguish it from other system input modulations.

In U.S. Pat. No. 4,152,071, the mirrors forming the vertices of the closed-loop path were positionally modulated in such a fashion so as to minimize the amplitude of the coupled energy generated modulations of a selected single beam intensity, for exaple, only the counterclockwise beam or wave. The amplitude of the coupled energy generated modulation of a single wave was used as a discriminant for a control system for manipulating the position of the mirrors forming the vertices of the closed-loop path. However, the invention of the referred to patent does not take into consideration both phase and amplitude of the coupled energy generated modulation of each wave which is related to the true value of energy coupling independently coupled into each of the waves. In the present invention, the coupled energy generated modulation characteristic, both phase and magnitude, of each of the counterpropagating waves in the laser angular rate sensor is utilized to generate a new and useful discriminant for mirror positioning to minimize a weighted vectorial sum of wave energy coupling and thereby reduce lock-in rate and the effects associated therewith. The discriminant of the present invention is a superior discriminant over that shown in U.S. Pat. No. 4,152,071 since it is more closely related to the actual relationship of the lock-in error source as will be discussed below.

Shown in FIG. 2 is one type of a closed-loop path employed in some laser angular rate sensors of the prior art. Although a triangular closed-loop path is shown in FIG. 2, the concepts can be applied to other types or forms of closed-loop paths including rectangular paths, etc. Shown in FIG. 2 is a diagrammatic representation of a first triangular closed-loop path traveled by the counterpropagating laser beams determined by a first position of flat surface mirrors 210 and 220 and concave mirror 230. The vertices of the closed-loop path are indicated by A, B, and C. This configuration is well known in the art. If mirror 210 is moved in a direction perpendicular to the surface thereof by a distance +x, and mirror 220 is moved also in a direction perpendicular to the surface thereof in an opposite direction by an amount −x, a new closed-loop path to be traveled by the laser beams is established as indicated by the vertices of the closed-loop path indicated by A', B', and C'. (Note that the diagrams shown in FIG. 2 are an exaggerated diagram to demonstrate the principles, the accuracy thereof is not important.)

The movement of mirrors 210 and 220 in FIG. 2 as aforesaid has altered the lasing path traveled by the counterpropagating beams. The positional relationship of the closed-loop path relative to each of the surfaces of mirrors 210, 220, and 230 has changed such that the waves traveling along path A'B'C' impinges on different surface regions of mirrors 210, 220 and 230 as compared with the waves impinging thereon while traveling along a path ABC. Note that the positional relationship has changed without appreciably altering the total path length. This is so because of the geometric relationships of the configuration chosen and the positional change of the mirrors selected. As is well understood by those skilled in the art, by maintaining the total path length constant, the steady state beam intensity, Io, will remain substantially constant.

It is important in understanding the present invention that anything which either (i) alters the lasing path propagated by the counterpropagating waves, or (ii) alters a contributing source of energy coupling between waves, will result in a change in the phase and amplitude of the coupled energy generated modulation superimposed on each of the wave intensities of each of the counterpropagating waves. Algebraically summing the coupled energy generated modulations, both phase and magnitude, in a preselected manner can provide an indication of the vectorial sum of the energy coupling, upon each wave, taking place in the cavity or waveguide about which the counterpropagating waves travel; and more importantly, the selected algebraic sum can be used as an indication of the lock-in rate of the sensor. In the sensor configuration shown in FIG. 2, any movement of any one of the mirrors 210, 220, or 230 by either translation or rotation will alter the coupling of energy between waves. Movement of the mirror alters the phase of the backscattered waves at the mirror surfaces which in turn can affect the phasing of other contributors of energy coupling along the lasing path. Further, any movement of any one of the mirrors by rotation or translation in a direction perpendicular to the surface thereof will alter the lasing path and subsequently alter the phasing of any contributors of energy coupling along the lasing path including, among others, forward and backward scatter at each of the mirror surfaces. Although not shown, it is possible to alter the lasing path by other means such as by optical apparatuses in the path of the waves. In the following exposition, only motion perpendicular to the surface of the mirror for altering the lasing path will be discussed, but it is emphasized that the principles of the invention are applicable to any motion of the mirrors or other means for altering the lasing path or contributors of energy coupling along the lasing path.

In the closed-loop control system of U.S. Pat. No. 4,152,071, the lasing path is altered by positionally dithering mirrors 210 and 220, in and out, perpendicular to the surface of the mirrors. The dithering of mirrors 210 and 220 alters the coupling of energy between waves along the lasing path as a result of a variation in the positional relationship between the closed-loop path and the surface of the mirrors. Subsequently, a variation in the magnitude of the coupled energy generated modulation of each wave is produced which depends on the average position of mirrors 210 and 220. This is observed by monitoring the characteristic of a single beam intensity signal which is provided by a photodetector responsive to a portion of one of the counterpropagating beams of light. The average position of one or both of the mirrors 210 and 220, about which positionally dithering occurs, is positioned so as to minimize the average value of the variation in coupled energy generated modulation due to the dithering motion of the positionally dithered mirrors. As will be explained in greater detail, a similar control scheme is employed in the present invention except a new and novel discriminant is generated for control purposes.

Coccoli, et al., in U.S. Pat. No. 3,533,014, taught that the amount of light scattering at the mirror surface changes as the position of the mirror is moved parallel to the surface thereof. The discriminant of U.S. Pat. No. 4,152,071 and the discriminant of the present invention could be used to control the position of these mirrors moved parallel to the surface thereof in order to obtain minimum light scattering and accordingly establish a minimum lock-in rate.

Shown in FIG. 3 is one embodiment of the present invention applied to a triangular laser angular rate sensor, by way of example, generally depicted by reference numeral 300. The triangular closed-loop path of the counterpropagating waves is defined by a pair of transducers 301 and 302, each having reflective surfaces 301a and 302a and a third mirror 303. Each of the transducers 301 and 302 is adapted to receive an input signal for control thereof so as to position the mirrors 301a and 302a. A third reflective surface is provided by mirror 303 which preferably has a curved concave inwardly reflective surface for ease of alignment. Mirrors 301, 302, and 303 form vertices of a triangular closed-loop path for sustaining counterpropagating laser beams.

Briefly, transducers 301 and 302, may be piezo-electric devices having corresponding mirror surfaces 301a and 302a, which are adapted to be each controlled so as to have their respective mirror surfaces perpendicular to the mirror surfaces thereof. The magnitude of perpendicular movement of the mirrors is a function of an electrical energization applied to the control element of the transducer as is more fully taught in U.S. Pat. No. 3,581,227. Mirror surface 303 is partially transmissive to allow a small portion of each of the counterpropagating beams to transmit therethrough as indicated by the light waves IW1 and IW2. Wave IW1 impinges upon detector 310a which provides an electrical signal I1 representative of the intensity of one of the counterpropagating waves traveling along the closed-loop path of the sensor 300. Similarly, wave IW2 impinges upon detector 310b which provides an output signal I2 representative of the other of the counterpropagating waves. Signal I1 will exhibit amplitude modulation proportional to the coupled energy generated modulation of one of the primary waves represented by wave IW1 and signal I2 will exhibit amplitude modulation proportional to the coupled energy generated modulation of the other primary wave represented by wave IW2. In accordance with the present invention, signals I1 and I2 are processed to obtain a weighted vectorial sum of the energy coupling between the waves so as to obtain a minimum lock-in rate as will be described below.

Signals I1 and I2 are processed by discriminant generator 320 providing an output signal D representative of the new discriminant of the present invention which will be described in more detail below. The output signal D is presented to a path position control means 330 which provides an output signal for control of transducers 301 and 302. In FIG. 3, the output of path positional control 330 is connected directly to transducer 301 and is connected to transducer 302 through a phase inverter 340 so as to move transducer 302 in an opposite sense to transducer 301 so as to maintain a constant path length of the triangular closed-loop path.

Figure 4:
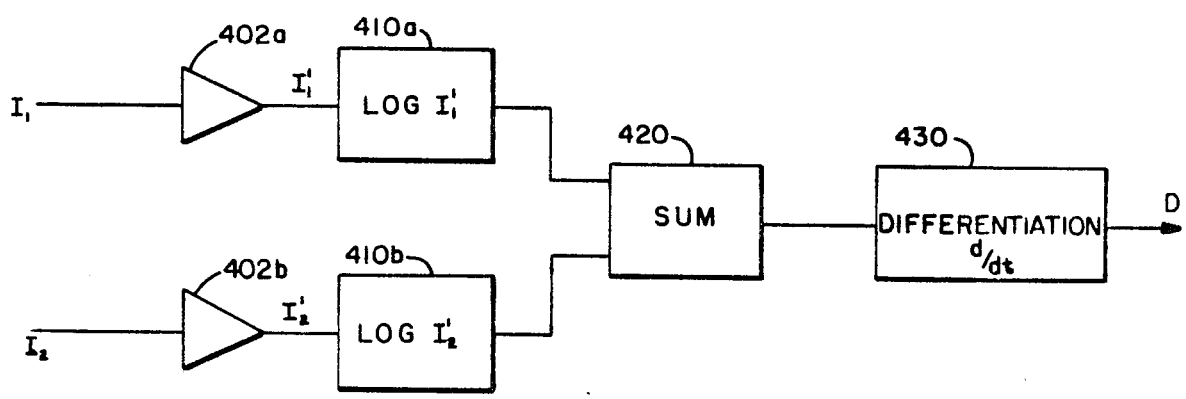
FIG. 4 is a schematic block diagram showing one implementation of the discriminant generator of FIG. 3.

A more detailed showing of the discriminant generator 320 is shown in FIG. 4. Signals I1 and I2 are amplified by amplifiers 402a and 402b, respectively. The output of amplifiers 402a and 402b are indicated by signals I1' and I2'. These signals, in turn, are presented to log signal generators 410a and 410b respectively having outputs which are summed by summing circuit 420. The output of summing circuit 420 is differentiated by differentiator circuit 430 having the designated novel discriminant output signal, D as will be now described.

The output signal, D, representative of the novel discriminant of the present invention may be mathematically expressed by:

$$D = \frac{\dot{I_1}}{I_1} + \frac{\dot{I_2}}{I_2} \tag{2}$$

The discriminant generator 320 performs the analog computation $$\frac{d(\text{Log } I1 + \text{Log } I2)}{dt}$$

which is identical to the discriminant expressed in equation (2). The amplitude modulation of the discriminant, D, as will be explained, is indicative of the weighted energy coupling between the waves accumulated along the closed-loop path propagated by the waves, including wave scattering at each of the mirrors or reflective surfaces forming the vertices of the closed-loop path. Further, the amplitude modulation of the discriminant D is indicative of the lock-in rate, as will now be explained.

The discriminant expressed in equation (2) can be shown to be valid by starting with the equations for a laser gyro substantially described in the publication by Aronowitz and Collins referred to earlier. Rearranging equations (7), (8), and (11) of the aforesaid publication yields:

$$\frac{\dot{I_1}}{I_1} = \alpha - \beta I_1 - \theta I_2 - 2r_2 \sqrt{\frac{I_2}{I_1}} \cos(\psi + \epsilon_2) \tag{3}$$

$$\frac{\dot{I_2}}{I_2} = \alpha - \beta I_2 - \phi I_1 - 2r_1 \sqrt{\frac{I_1}{I_2}} \cos(\psi - \epsilon_1) \tag{4}$$

$$\dot{\psi} = \Omega + r_2 \sqrt{\frac{I_2}{I_1}} \sin(\psi + \epsilon_2) + r_1 \sqrt{\frac{I_1}{I_2}} \sin(\psi - \epsilon_1) \tag{5}$$

where,

I1, I2, are the intensities of the counterpropagating laser beams, $\alpha$ represents the excess of gain minus loss, $\beta$ represents the saturation effect of each field, $\theta$ represents mutual saturation effect, $r_1$, $r_2$ represents the energy coupling coefficient of energy coupled from one beam into the other, and includes backscatter.

$\psi$ is the instantaneous phase angle between the two waves, $\epsilon_1$, $\epsilon_2$ represents the phase angle associated with $r_1$ and $r_2$ respectively.

Substituting equations (3) and (4) into equation (2) the discriminant D is:

$$D = \frac{\dot{I_1}}{I_1} + \frac{\dot{I_2}}{I_2} = 2\alpha - (\theta + \beta)(I_1 + I_2) - \tag{6}$$

$$2r_2 \sqrt{\frac{I_2}{I_1}} \cos(\psi + \epsilon_2) - 2r_1 \sqrt{\frac{I_1}{I_2}} \cos(\psi - \epsilon_1)$$

Assuming:

$$\sqrt{\frac{I_2}{I_1}} \approx \sqrt{\frac{I_1}{I_2}} \approx 1$$

and that the coupled energy generated modulations of I1 and I2 are much less than the steady state value of the intensity, and using the Laplace transforms to solve the solution of equation (6) yields:

$$D = 2\left(\frac{\beta + \theta}{S + \alpha} - 1\right)(R_2 \angle \epsilon_2 + R_1 \angle -\epsilon_1) \tag{7}$$

where $R_1 \angle -\epsilon_1$ and $R_2 \angle \epsilon_2$ are the Laplace transform magnitude and angles of $r_2 \cos(\psi + \epsilon_2)$ and $r_1 \cos(\psi - \epsilon_1)$ and S is the standard Laplace variable. Using the same approximations and transforms on equation (5), we find the solution of equation (5) to be:

$$\dot{\psi} = \Omega + R_2 \angle \epsilon_2 - \pi/2 + R_1 \angle -\epsilon_1 - \pi/2 \tag{8}$$

As is well known in the art of laser gyros, the rotation rate is determined by combining a portion of each of the counterpropagating beams (e.g., IW1 and IW2) and forming an interference pattern. The rate of change in the movement of the light-dark-bands of interference pattern is directly related to $\dot{\psi}$, the rate of change of the instantaneous phase between the counterpropagating waves of light. Integration of $\dot{\psi}$, when multiplied by the appropriate scale factor yields the angular rotation of the closed-loop path. Equation (8) shows that the observable parameter $\dot{\psi}$ contains phasor error terms which, of course, yield rate error terms in the gyro as well as angular rotation error. It is possible to minimize the vectorial sum of these error terms as will be further discussed.

Figure 5A:
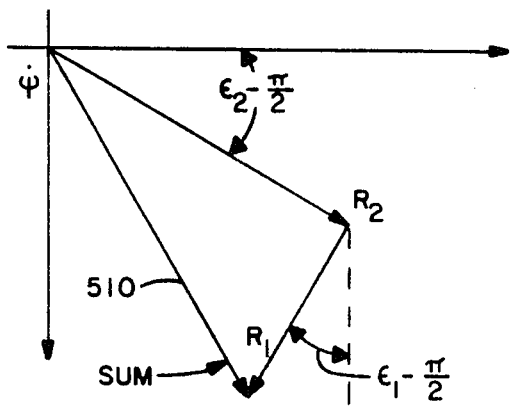
FIGS. 5a and 5b show phasor diagrams showing the relationship between lock-in error and discriminant of the present invention.

The phasor terms in equation (5) and corresponding equation (8) represent a rotation rate error term, as aforesaid, due to the energy coupling between waves, the dominant source being backscattering caused primarily by the mirrors defining the closed-loop path of the laser gyro system. Although these error terms are ever present, these terms are that which determine the value of lock-in rate (Aronowitz and Collins). The values, $R_1$ and $R_2$, in equation (8) represent the magnitude of the coupled energy generated modulations of each beam intensity caused by the energy coupling of one beam into the other. FIG. 5a graphically shows the total error in $\dot{\psi}$ as a sum of two phasors described by equation (8) having a vectorial sum indicated by vector 510.

Figure 5B:
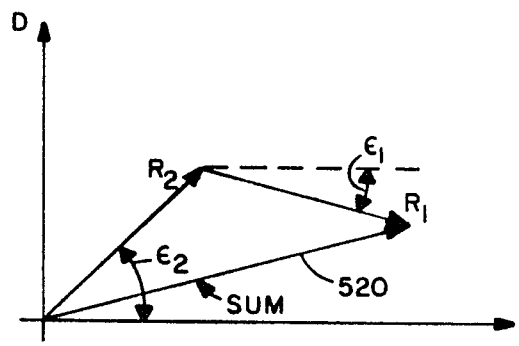

The discriminant D expressed in equation (7) includes a multipler term expressed as the sum of two phasors which are graphically shown in FIG. 5b. The magnitude of D is directly related to the Vectorial sum of the two phasors. The two phasors correspond to the error terms of the equation (8). The total vectorial sum of the discriminant multiplier term is shown in FIG. 5b by vector 520. Analysis of equations (7) and (8) and the diagrammatic representations of the vectorial sum of their respective phasor terms in phasor space, as indicated by FIGS. 5a and 5b, show that the vectorial sum indicated by vector 520 in FIG. 5a corresponds directly to the vectorial sum 510, and differ only in phase which is unimportant. Therefore, if the vectorial sum of phasor terms of the discriminant is minimized, say by altering the lasing path, the vectorial sum of the error terms in $\psi$ caused by energy coupling between the beams while traveling along the closed-loop path system is also minimized. The foregoing analysis is valid for all frequencies and thus may be applied to non-biased, constant rate biased and dithered biased (alternating bias) laser angular rate sensors which are well known in the art. These features will be described in more detail with reference to the embodiments described below.

The vectorial sum of the error terms as expressed by the phasor terms in equation (8) are directly related to the lock-in rate of ring laser gyro system chosen (Aronowitz and Collins). Further, the system scale factor is also related to the vectorial sum of the error terms. Therefore, if the phasor terms of the discriminant expressed in equation (7) are minimized, the lock-in rate is minimized. Thus, minimizing the vectorial sum of the error terms, i.e. the weighted vectorial sum of the energy coupling between each of the counterpropagating waves minimizes the lock-in rate of the system and improves scale factor linearity and stability.

Note that scale factor of a ring laser angular rate sensor is primarily dependent on the geometry of the configuration chosen. However, energy coupling between waves which causes lock-in also affects the scale factor linearity. Therefore, controlling the error terms controls the scale factor linearity substantially and also will improve the sensor's bias stability.

From a simplistic standpoint, the discriminant, as expressed by equation (2), contains an amplitude modulation at the beat frequency, i.e. the frequency difference between the two beams resulting from rotation, which is representative of a composite of the individual coupled energy generated modulations superimposed on each of the counterpropagating waves due to the energy coupling between waves. As analytically demonstrated, neither of the coupled energy generated modulations by themselves or simplistically summing or differing these modulations provide an indication of the lock-in rate, but the weighted vectorial sum does provide an indication thereof. The amplitude modulations of the discriminant of the present invention provides an observable parameter in direct relationship to the weighted vectorial sum for altering the lasing path and/or altering mirror scattering. The weighted vectorial sum can be minimized by optimally positioning the closed-loop path traveled by the waves relative to the mirror surfaces to obtain the minimum lock-in rate of the system, as well as the optimum scale factor linearity.

Shown in FIG. 6 is a more detailed embodiment of the invention shown in FIG. 3 with similar functioning and arranged components of those shown in FIG. 3 having the same numeral designations. Referring now to FIG. 6, laser angular rate sensor 300 is again shown having output beams IW1 and IW2 which are representative of the counterpropagating waves traveling within the laser angular rate sensor 300. Two detectors, 310a and 310b, respond to the output beams IW1 and IW2 and are presented to the discriminant generator 320 which is substantially shown in FIG. 4 and is redrawn within block 320 in FIG. 6.

The description which follows will assume rotational dithering which provides an alternating frequency bias in the sensor by mechanically oscillating sensor 300 in a rotational mode about axis 301 as indicated by arrows 302. Rotational dithering and the frequency bias provided is well known in the art and is similar to that described in U.S. Pat. Nos. 3,467,472 and 4,152,071. Other types of bias can also be provided within the scope of the present invention.

Referring again to FIG. 6, the discriminant generator 320 output signal, D, is indicated by output signal 610. Output signal 610 is presented to a path position control means 330 including peak detector 620, oscillator 630, synchronous demodulator 640, integrator 650, and summing circuit 660. The output of the path position control means 330 is indicated by reference numeral 670, and is connected directly to transducer 301, and is connected to transducer 302 through a phase inverter 340.

The amplitude of discriminant generator 320 output signal, 610, i.e. D, as already indicated, is directly related to the lock-in rate of the rate sensor 300. The discriminant generator output signal 610 is presented to a peak detector 620 for subsequent signal processing by synchronous demodulator 640 and integrator 650. Synchronous demodulator 640 has as a first input the output of peak detector 620, and has as a second input the output of oscillator 630. The output of the synchronous demodulator is presented to integrator 650 having an output signal presented to summing circuit 660. Summing circuit 660 sums the output of integrator 650 and the output of oscillator 630.

The output of summing circuit 660, indicated by numeral 670, has a DC signal component provided by integrator 650 plus an AC signal component provided by oscillator 630. This combination of the additive DC and AC signal components is directly provided to transducer 301, and to transducer 302 through a phase inverter 340. Phase inverter 340 can be provided by a variety of electronics which inverts the phase of the AC signal by 180°, and reverses the polarity of the DC component. In the exposition which follows, oscillator 630 will be considered as a square wave oscillator causing the position of the mirrors to alternately change between two states, the movement of each mirror changing by equal amounts but of opposite sense due to phase inverter 340. Further, it will be assumed that the frequency of the alternating bias which oscillates the sensor will be greater than the frequency of oscillator 630 and will provide a sinusoidally varying rotational oscillation. Thus, several oscillations of frequency bias will occur in each state of mirror position controlled by oscillator 630. Note that these assumptions are presented for exposition purposes to aid in understanding the invention. Many types of oscillations and frequencies are of course possible within the scope of the present invention.

The closed-loop path position control system shown in FIG. 6 will now be described. For discussion purposes, assume that the DC signal component presented to transducers 301 and 302 is zero, and that the only signal received by the transducers is the AC signal component provided by oscillator 630 which modulates the position of the mirror surfaces of transducers 301 and 302. Since the signal fed to transducer 302 is 180° out of phase with transducer 301, a situation will exist as already described with reference to FIG. 2. That is, the positional relationship of the closed-loop path along which the laser beams travel is changed relative to each of the surfaces of each of the mirrors without substantially affecting the total path length of the closed-loop path. Doing so alters the lasing path so as to alter the coupling between each wave along the lasing path, and particularly alters the scattered waves at the reflective surfaces of the mirrors which provide the vertices of the closed-loop path. The positional changing of the mirror as provided by oscillator 630 will henceforth be termed "discriminant dithering."

Discriminant dithering will cause the output signal 610 of the discriminant generator to vary with a frequency component directly dependent upon the frequency of oscillator 630. The amplitude of output signal 610 will vary at the frequency of oscillator 630 and at the beat frequency. This is so since the discriminant is varying at the beat frequency since it is a function of the coupled energy generated modulation, and the magnitude of coupled energy generated modulation is varying as a function of the frequency of oscillator 630 since the lasing path is altered at that frequency due to the positionally dithering of mirrors 301 and 302.

The impact of discriminant dithering and rotational dithering on the discriminant output is indicated in FIG. 6a which graphically shows the discriminant output 610. The change in states of the mirrors due to discriminant dithering produced by oscillator 630 is indicated by numerals 611a and 611b. Each rotational dither cycle causes the rotation rate of the sensor to pass through the lock-in rate twice, once for each direction of rotation. The peak value of the varying value of the coupled energy generated modulation, Am, occurs about the lock-in rate. Peaks 612 correspond to those peak values of Am due to rotational dithering while in one state of discriminant dither, and peaks 613 correspond to those peak values of Am which correspond to the other state of discriminant dither.

The peaks 612 and 613 are peak detected by peak detector 620 and are indicated in FIG. 6a by numerals 621 and 622. One example of a peak detector 620 is a simple low pass filter with a time constant to hold each peak (612 and 613) of each dither cycle for (i) subsequent demodulating at the frequency of oscillator 630 by demodulator 640, and (ii) integration by integrator 650. Since the discriminant has many peaks occurring at the rate of the beat frequency, each peak could be detected by appropriate circuitry, but only detecting substantially the maximum peak value occurring at the lock-in rate is satisfactory. Further, the peak detector could also be provided by a simple rectifier. The important function to be realized is the ability to detect the peak amplitudes of coupled energy generated modulations of the discriminant.

The peak value variations of the discriminant due to discriminant dithering are averaged by the path position control circuit 330 including the peak detector 620, synchronous demodulator 640, and integrator 650. These components are well known in the art and their function, in combination, is well known to those skilled in the art of control circuitry. Briefly, the peak detector 620 detects the peak amplitudes of the amplitude variations of the discriminant which are varying at the frequency of oscillator 630. Synchronous demodulator 640 determines the variation in the peak values of the discriminant amplitude variations at the frequency of oscillator 630. Integrator 650 averages the peak values thereof provided by peak detector 620. The output of integrator 650 provides a DC signal having polarity and magnitude indicative of the variation in the discriminant due to discriminant dithering. Thus, the output of integrator 650 can be utilized as a control signal component for driving transducers 301 and 302, in opposite sense. The control signal can then alter the lasing path of the counterpropagating waves and the scattering at the mirror surfaces by altering the average position of the mirrors 301a and 302a respectively about which discriminant dithering takes place. Accordingly, a position can be reached where the variation in the discriminant due to discriminant dithering is minimal, which corresponds to a minimum vectorial sum of energy coupling between waves, minimum lock-in rate, and optimum linearity of the sensor.

As was discussed above with respect to the analysis of the discriminant of the present invention, the amplitude of the coupled energy generated modulations of the discriminant can be minimized by altering the lasing path to an optimum positional relationship between the closed-loop path traveled by the laser beams relative to the mirror surfaces. Thus, appropriate phasing between control of transducers 301 and 302 and the polarity of the output of integrator 650 must be arranged so that the average position of transducers 301 and 302 about which discriminant dithering takes place results in the variation in the amplitude of the coupled energy generated modulation of the discriminant caused by discriminant dithering to be at a minimum. Note that incorrect phasing of the system results in a maximum variation in the amplitude thereof.

Figure 7:
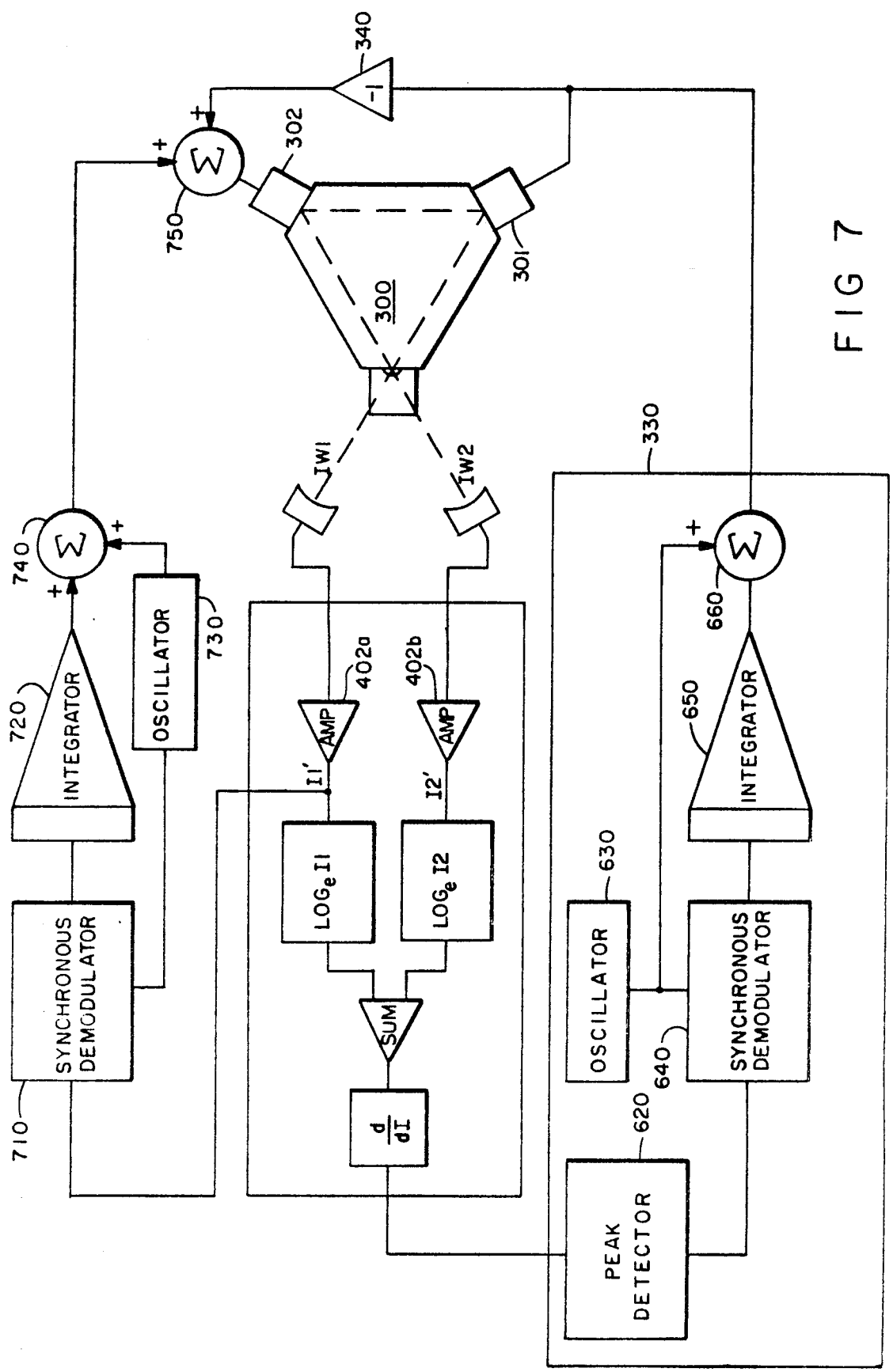
FIG. 7 is a schematic block diagram showing further details of the control system shown in FIG. 6 with the addition of a path length control loop.

FIG. 7 is another embodiment of the invention which is similar to that shown in FIG. 6 with the addition of a path length control system. It is well known in the art of laser angular rate sensors to operate the sensor with the laser beams operating at maximum intensity. Doing so reduces the effects of other sources of error inherent in the sensor as well as lowering the lock-in rate of the system. In the system of FIG. 7, similar functioning and arranged blocks as those shown in FIG. 6 have retained the same numeral designation as FIG. 6. The additional path length control is provided by synchronous demodulator 710, integrator 720, oscillator 730, and summing circuit 740.

Synchronous demodulator 710 has as a first input the output of amplifier 402a having a signal representative of the intensity of one of the propagating waves and is designated in FIG. 7 as I1'. The second input to synchronous demodulator 710 is provided by oscillator 730. The output of the synchronous demodulator 710 is integrated by integrator 720 and provides a first input to summing circuit 740 which sums the output of integrator 710 and the output of oscillator 730. The output of summing circuit 740 becomes one input of summing circuit 750. Summing circuit 750 sums the output of summing circuit 740 with the output of phase inverter 340. The output of summing circuit 750 is connected to the input of transducer 302. The output of summing circuit 750 includes (i) the AC signal component provided by oscillator 730; (ii) the path length control DC signal component provided by the output of integrator 720; (iii) the phase inverted AC signal component provided by oscillator 630; and (iv) the phase inverted discriminant DC path position control signal component provided by integrator 650.

The operation of the path length control shown in FIG. 7 is well known and will be briefly described.

Assuming there is no signal from the output of phase inverter 340, the output of summing circuit 740 is directly connected to transducer 302 for control thereof. The oscillator 730 dithers the position of mirror 302 resulting in a varying total path length of the closed-loop path traveled by counterpropagating waves resulting in beam intensity modulation, at the frequency of oscillator 730, of the counterpropagating waves of laser angular rate sensor 300. Hence the beam intensity modulation produced by path length modulation will be called "path length dithering". Path length dithering caused by oscillator 730 at the frequency thereof is detected by the synchronous demodulator 710 which is synchronized at the frequency of oscillator 730. In turn, the synchronous demodulator 710 output is integrated by integrator 720 and provides a DC signal component which is added to the output of oscillator 730 by summing circuit 740. Again, appropriate phasing must be established between the transducer 302 and the synchronous demodulator 730 so as to obtain the desired result of maximizing the intensity of the counterpropagating beams. The path length control system is such that the variation in the magnitude of the beam intensity modulation of signal I1, namely I1', caused by the path length dithering is minimized which is an indication that the intensity is at a maximum.

In a practical sense, the frequency of the path length control oscillator 730 should be substantially different, say by at least one order of magnitude, than that of the path position control oscillator 630 which is part of the path position control circuit 330. It is also desirable that the frequency of oscillator 730 be greater than the frequency of oscillator 630, but this does not have to be so. Further, it is desirable that the time constant of the path length control loop be sufficiently faster than that of the path position control loop for stable control. In these circumstances, summing circuit 750 can properly sum, by superposition, the output of summing circuit 740 being the output of the path length control loop, and the output of phase inverter 340, being the output of the path position control 330. These two signals, combined by summing circuit 750, can be applied directly to transducer 302 to provide the desired system behavior so that signals I1 and I2 have frequency components related to the frequency of oscillator 630 of the path position control 330, and components related to the frequency of oscillator 730 of the path length control loop.

Although not shown, it is of course possible to add the output signals of summing circuit 740 and summing circuit 660 before being applied to transducer 301 in addition to the circuitry already shown in FIG. 7 with the exception of the direct connection, shown therein, from the summing circuit 660 and transducer 301. When such a described system is utilized, the path length control sensitivity is improved by a factor of 2 since both transducers 301 and 302 would respond to the DC component in the same sense for positioning the transducers to vary the path length so as to maximize the intensity of the counterpropagating waves. In essence, the summing network just described behaves in a manner as summing circuit 750.

It is within the scope of the present application to utilize a single transducer having two degrees of freedom instead of the two transducers shown in the embodiments of the invention. For example, transducers are known in the art which can be constructed to provide translation (perpendicular to the reflective surface), and rotation about an axis through the plane of the reflective surface by control of a second transducer input control terminal. If such a transducer as aforesaid is utilized, the output of path position control means 330 may be applied to the transducer for rotation control which will alter the lasing path and/or mirror scattering and thereby minimize the coupling of energy between the waves for minimizing lock-in. Further, the path length control output may be connected concurrently to the same transducer for perpendicular translation for maintaining the intensity of the beams substantially constant.

The discussion and analysis above is applicable to any system where two waves propagate in opposite directions. The discriminant can be utilized for altering the path traveled by the waves, and/or altering the scatter at the reflective surfaces, particularly by positioning the reflective surfaces defining the closed-loop path such that the total vectorial sum of the energy coupling between the counterpropagating waves of the system is taken into account and controlled. The novel discriminant of the present invention is particularly useful in the art of laser angular rate sensors for either obtaining minimum random drift due to lock-in in alternating biased systems, and/or optimizing scale factor linearity in constant rate biased systems.

Note that the systems of FIGS. 3, 6, and 7 are also applicable to such systems when alternating bias is applied by affecting the counterpropagating waves or beams directly instead of rotational dithering. The behavior of these systems and the operation thereof is similar to the system operation as just discussed above.

Consider now the operation of FIGS. 3, 6, and 7 when either system is provided with a constant bias such that a constant frequency difference exists between the frequencies of the counterpropagating waves for rotation rates, clockwise or counterclockwise, within the operating limits of the sensor. The constant bias may be provided optically by affecting the beams directly or by rotating the sensor at a constant rate. In such systems, the counterpropagating waves are prevented from locking in to a common frequency at even low rotation rates below the lock-in rate of rotation since at zero rotation there exists a sufficiently large frequency difference so as to avoid lock-in. Therefore, in such systems minimizing lock-in per se is not significant. Nevertheless, the phasor error terms in $\psi$ of equation (8) impact the system output data and the system scale factor since the error terms are ever present in the observable parameter $\psi$. As noted earlier, affecting the error terms affects the system lock-in rate and accordingly affects the scale factor.

From the foregoing discussion, controlling the lock-in rate controls the sensor system scale factor within a finite range above that defined by other controlling factors such as total path length and area circumscribed. Further, minimizing the sensor system lock-in rate optimizes the scale factor linearity since scale factor can be substantially defined by:

$$SF = SF_\infty \left\{ 1 + (\tfrac{1}{2}) \frac{\Omega_s^2}{\Omega^2 + \Omega_g^2} \right\}$$

where
  $\Omega$ is the sensor rotation rate,
  $\Omega_g$ is a laser gain parameter,
  $\Omega_s$ is the total mirror scattering parameter, and $SF_\infty$ is the asymptotic scale factor.

Minimizing $\Omega_s$ optimizes scale factor linearity. Since $\Omega_s$, the scattering, is directly related to the system lock-in rate, $\Omega_s$ is directly related to the novel discriminant of the present invention and expressed substantially by equation (2). Therefore, the discriminant D can be used for controlling $\Omega_s$ and thus scale factor. This is extremely important since it directly affects bias stability of the sensor. Equally important, the discriminant D can be used to optimize scale factor linearity by minimizing the amplitude of the discriminant in the same manner for minimizing the sensor system lock-in rate, i.e. minimizing $\Omega_s$. Accordingly, the novel discriminant D of the present invention and the systems of FIGS. 3, 6, and 7 can be utilized for selecting scale factor or optimizing scale factor linearity. Although this process can be used with alternating bias systems, the process is particularly useful with constant bias sensor systems where the bias is provided electronically/optically, such as with a Faraday Cell, or mechanically such as mechanically rotating the system at a constant rate.

There are many techniques known in the prior art for overcoming or reducing the effects of the lock-in phenomenon of the laser angular rate sensors. Among others, they include constant bias and alternating bias approaches which reduce the effects, but have nothing to do with lock-in rate. The bias may be provided by mechanical rotation of the sensor, or frequency separating devices in the path of the counterpropagating waves. Whether the mechanical approach of rotating or the electro-optical approach of frequency separating is chosen, the goals are substantially the same, that is, to minimize angular rate or angular errors in the output of the sensor. The systems shown in FIGS. 3, 6 and 7 which reduce the lock-in rate are applicable to such biased angular rate sensor systems. However, in some situations, different techniques of obtaining the novel discriminant than the simplistic approach shown in FIGS. 3, 4, 6 and 7 may be required in order to obtain the information so as to generate the discriminant. These situations will arise when the discriminant-to-noise ratio is poor. This is the usual situation with constant bias systems since the amplitude of the coupled energy generated modulation, Am, is much smaller than that which occur about the lock-in rate, i.e. when the frequencies of the two waves lock-in. Systems for combatting such situations will be described below with reference to FIGS. 8 and 10.

Figure 8:
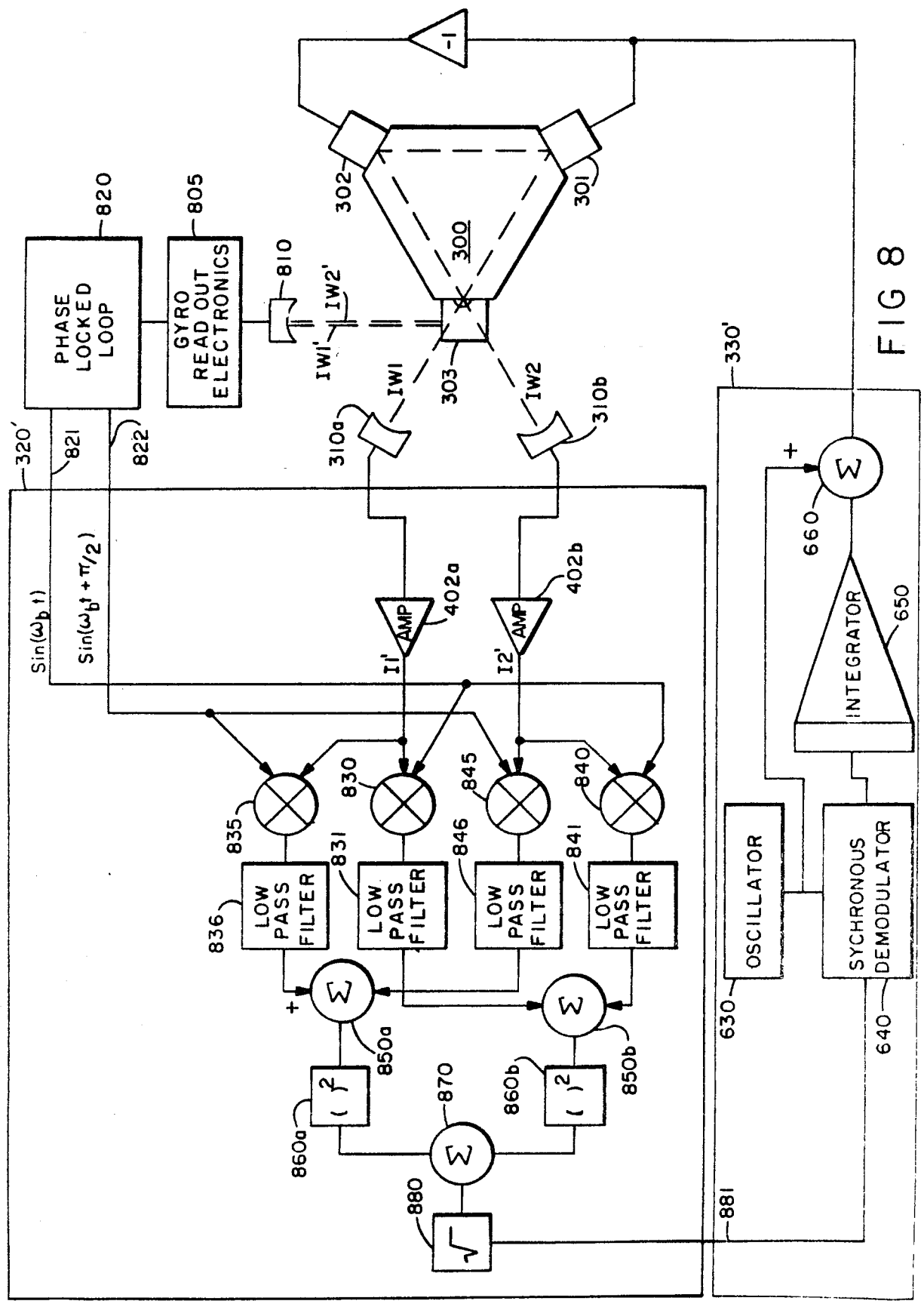
FIG. 8 is a schematic block diagram of another embodiment of the invention.

The system shown in FIG. 8 is another embodiment of the invention showing another means for obtaining the discriminant of the present invention which is indicative of the weighted vectorial sum of the coupling of energy between the waves related to the system lock-in rate. The system of FIG. 8 provides a different technique for obtaining information of the amplitude of the coupled energy generated modulation contained in the intensity of each wave. It is paramount for the understanding of the circuit shown in FIG. 8 to note again that the coupled energy generated modulations of the beam intensities IW1 and IW2 are substantially at the beat frequency established between the counterpropagating waves. That is, the beat frequency is the frequency difference between the frequency of each of the counterpropagating waves. The novel system shown in FIG. 8 synchronously detects the coupled energy generated modulations of the beam intensity at the existing beat frequency for obtaining amplitude and phase information of the coupled energy generated modulations of the beam intensity for subsequent processing to obtain the novel discriminant of the present application in a somewhat different form.

In FIG. 8, similar functioning and arranged components as those in FIGS. 3, 6, and 7 have the same numeral designations in FIG. 8. Shown in FIG. 8 is the laser angular rate sensor 300 similar to that shown in FIGS. 3, 6, and 7. Again, laser angular rate sensor 300 provides output beam signals IW1 and IW2 for detection by detectors 310a and 310b in the manner as already described.

Although not explicitly shown in FIG. 8, mirror 303 includes an output optical system (not shown) coupled to mirror 303 for providing output waves IW1' and IW2'. The output optical system is constructed so that waves IW1' and IW2' exit from the optical system at a slight angle with respect to each other forming an interference pattern on detector 810. The combination of the output optical system, waves IW1' and IW2', and detector 810 are well known in the art for obtaining rate information from the sensor. Furthermore, it is well known that the interference pattern created by the combined waves IW1' and IW2' moves across the surface of detector 810 at a rate equal to the beat frequency associated with the counterpropagating waves. The output of detector 810 is connected to a phase lock loop 820 for providing a pair of reference signals at the beat frequency, but with one reference signal phase-shifted by $\pi/2$ with respect to the other. The first mentioned signal is defined as the inphase reference signal and the second reference signal is defined as the phase quadrature reference signal, each being a function of the beat frequency. Thus, the output of the phase lock loop 820 generates the inphase signal 821 and phase quadrature signal 822 at the beat frequency dependent upon the rotation of the sensor 300. It is desirable that signals 821 and 822 have equal amplitudes. The pair of reference signals may be sinusoidal as indicated on FIG. 8, or other forms of signals such as a square wave.

The discriminant generator for the system shown in FIG. 8 is identified by the large block 320' which is different than discriminant generator 320 shown in FIGS. 4, 6, and 7 with the exception of amplifiers 401a and 401b. Discriminant generator 320' comprises signal multipliers 830, 835, 840, and 845, low pass filters 831, 836, 841, and 846, summing circuits 850a, 850b, and 870, squaring circuits 860a and 860b, and a square root circuit 880. The output of amplifier 402a, being signal I1', is presented to multipliers 830 and 835 for multiplication by the inphase reference signal 821 and the phase quadrature reference signal 822 in multipliers 830 and 835 respectively. The output of amplifier 402b, being signal I2', is presented to multipliers 840 and 845 for multiplication by the inphase reference signal 820 and phase quadrature reference signal 822 in multipliers 840 and 845 respectively. Each of the multipliers 830, 835, 840, and 845 provides an output signal indicative of the product of their inputs.

The output signal of each multiplier 830, 835, 840, and 845 is passed through a low pass filter 831, 836, 841 and 846 respectively. The output signal of filter 831 is summed with the output of filter 846 by summing circuit 850a; the output signal of filter 831 is summed with the output of filter 841 by summing circuit 850b. The output of summing circuit 850a is squared by squaring circuit 860a and summed by summing circuit 870 with the output of squaring circuit 860b which is the square of the output of summing circuit 850b. The output of summing circuit 870 is connected to a square root circuit 880 for providing the square root value of the output of summing circuit 870.

The output of the discriminant generator 320' in FIG. 8 is the output of the square root circuit 880 as indicated by output signal 881. The output signal 881 is presented as a first input to synchronous demodulator 640. Output signal 881 is synchronously demodulated at the frequency of oscillator 630 in a manner as already described with respect to FIG. 6. The output of synchronous demodulator 640 is integrated by integrator 650 and is summed by summing circuit 660 with the output of oscillator 630 for providing the path position control signal for transducers 301 and 302 in a manner as already described relative to FIGS. 6 and 7.

As will now be described, the output of the discriminant generator 320' is a signal representative of the variations in the backscatter generated modulations of the discriminant of the present invention, indicated by equation (2), resulting from the discriminant dithering produced by oscillator 630 in combination with transducers 301 and 302 in a manner similar as that already described with respect to FIG. 6.

The discriminant generator 320' shown in FIG. 8 is a high signal-to-noise ratio circuit. It requires not only signals representative of the beam intensity of each of the propagating waves like that of discriminant generator 320, but also requires inphase and phase quadrature reference signals at the beat frequency established between the propagating waves.

The inphase and phase quadrature beat frequency signals may be obtained in a variety of ways. FIG. 8 shows the use of a phase lock loop 820 in combination with the normal detector found in most laser angular rate sensors for determining the beat frequency for obtaining rate information. The phase lock loop 820 has an an input the output of the readout electronics which is essentially the count pulses which occur at the beat frequency in a well known manner associated with the interference pattern readout of laser gyros.

Figure 9:
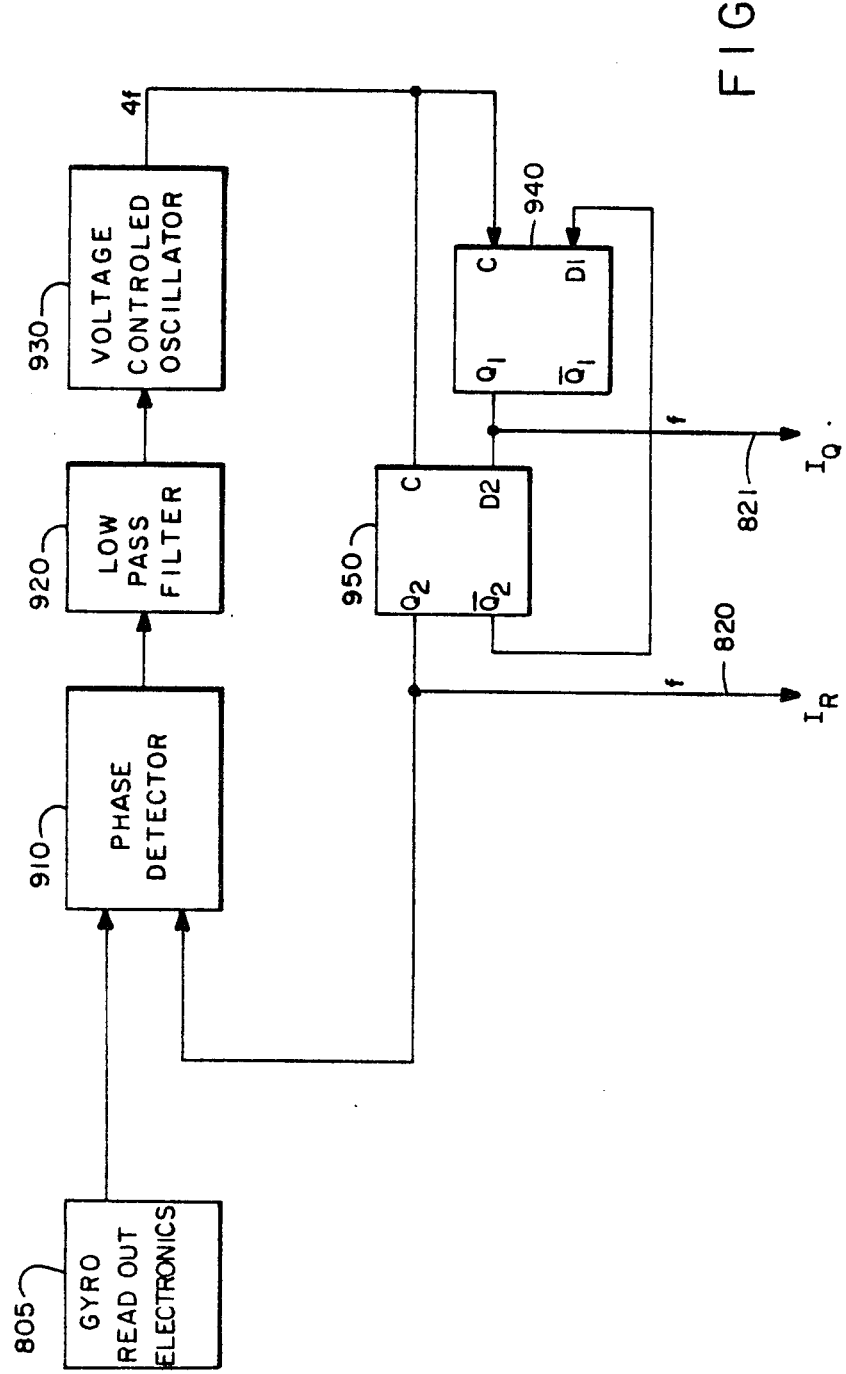
FIG. 9 diagrammatically shows a typical phase lock loop system.

FIG. 9 shows diagrammatically a typical phase lock loop. Phase detector 910 receives as a first input the output of gyro read out electronics 805, the output thereof being pulses at the beat frequency established between the counterpropagating waves of sensor 300. The output of phase detector 910 is passed through a low pass filter 920 and presented as an input to voltage controlled oscillator 930. The output of voltage controlled oscillator 930 is connected to a pair of flip-flops 940 and 950. The output of flip-flop 950 is presented to a second input of phase detector 910 and also becomes the inphase reference signal 821 having a signal frequency at the beat frequency established by the readout signal of gyro readout electronics 805. The Q-output of flip-flop 950 is connected to the D input of flip-flop 940. The Q-output of flip-flop 940 is connected to the D input of flip-flop 950. The Q-output of 940 becomes the phase quadrature reference signal 822 at also the beat frequency. Thus, the phase lock loop circuit 820 shown in FIG. 8 and detailed in FIG. 9 provides substantially constant amplitude signals at the beat frequency but are in phase quadrature, these signals being the reference signals required by the high signal-to-noise ratio discriminant generator 320'. The reference signals having constant amplitude voltage and being substantially the same frequency as the beat frequency are each multiplied separately by signals I1' and I2', as aforesaid. Although the output signals 821 an 822 provided by phase lock loop 820 shown in FIG. 9 are square wave signals, they need not be.

The operation of the high signal-to-noise ratio discriminant generator 320' will now be described. The output signal I1' and similarly I2' may be described by:

$$I1' = A_m \sin(\omega_b t + \theta) \tag{9}$$

where: $\theta$ is a relative phase angle related to the coupled energy generated modulation at the beat frequency $\omega_b$.

The inphase reference signal has the form:

$$K \sin(\omega_b t + \phi) \tag{10}$$

where $\phi$ is an arbitrary phase angle.

Then, the product of multiplier 830 is mathematically represented by:

$$P_{830} = \frac{KA_m}{2} \left\{ \begin{array}{l} [\cos\theta\cos\phi + \sin\theta\sin\phi] \\ + \sin 2\omega [\cos\theta\sin\phi + \sin\theta\cos\phi] \\ \cos 2\omega [\sin\theta\sin\phi - \cos\theta\cos\phi] \end{array} \right\} \tag{11}$$

The output of each of the multipliers 830, 835, 840, and 845 have a similar expression depending upon whether the signal is I1' or I2' and whether these signals are multiplied by the inphase reference signal 821 or phase quadrature reference signal 821.

The signal output of each of the multipliers 830, 835, 840, and 845 passes through a low pass filter, 831, 836, 841, and 846 respectively. The output signal of each low pass filter produces a DC signal representative of the first term within the major brackets of equation (11) associated with each multiplier. The rest of the terms are rejected by the low pass filters. This results in the output of each of the low pass filters being proportional to:

$$\frac{KA_m}{2} \cos(\theta - \phi) = \frac{KA_m}{2} [\cos\theta\cos\phi + \sin\theta\sin\phi] \tag{12}$$

where,
A is the amplitude of the reference signal in signals I1' and I2',
K is the amplitude of the reference signals, being substantially constant,
$(\theta - \phi)$ is the phase angle between the coupled energy generated modulations of signal I1' at the frequency of the reference signal and the reference signal itself.

In the system of FIG. 8, each of the coupled energy generated modulations of each of the beam intensities represented by signals I1 and I2 can be resolved into two orthogonal vectorial components. The orthogonal components of I1 are provided by low pass filter 831 which provides a signal representative of the inphase vectorial components of I1, and low pass filter 836 provides a signal representative of the phase quadrature component of signal I1 orthogonal to the inphase component. The orthogonal components of signal I2 are provided by low pass filter 840 which provides the inphase component of signal I2 and low pass filter 846 provides the phase quadrature component of signal I2. Each of the vectorial components are substantially represented by equation 12 where $\phi$ of one component is $\pi/2$ displaced in phase from the other. The discriminant generator 320' of FIG. 8 obtains the weighted vectorial sum of the coupled energy generated modulations of each of the intensities by summing squares of the individual sums of both the inphase vectorial components and the phase quadrature components of the intensity signals I1 and I2.

Referring to FIG. 8, the inphase vectorial components of I1 and I2 are summed by summing means 850a, and the output of summing means 850a is squared by squaring means 860a. The vectorial phase quadrature components of intensity signals I1 and I2 are summed by summing means 850b, and the output thereof is squared by squaring means 860a. Summing means 870 sums the output of the squaring means 860a and 860b providing an output indicative of the weighted vectorial sum of the coupled energy generated modulations. The output of summing means 870 is shown in FIG. 8 to be passed through a square root circuit for providing a signal of a different value than summing means 870, but is equally indicative of the weighted vectorial sum of the coupled energy generated modulation of the counterpropagating waves in sensor 300.

As will be shown, either the output of summing circuit 870 or the output of square root circuit 880 can be utilized for the discriminant sum since both represent the weighted vectorial sum of the coupled energy generated modulation of the intensities of each of the counterpropagating beams. The chosen discriminant signal, as aforesaid, is fed into the path position control 330' similar to that of path position control 330 indicated in FIGS. 6 and 7. Note that the path position control 330' differs from path position control 330 by the omission of peak detector 620 of FIG. 6. This is so since the output provided by the discriminant generator 320' is a DC signal directly related to the discriminant of the present invention, that is the weighted vectorial sum of the coupled energy generated modulations. Thus, the peak detector 620 is unnecessary.

The output of discriminant generator 320', provided by the functional blocks of FIG. 8 which were discussed immediately above, can be mathematically expressed by:

$$K^2[(A_{m1})^2 + (A_{m2})^2 + (A_{m1})(A_{m2})(\cos(\theta_1 - \theta_2))] \quad (14)$$

where
K is the amplitude of the reference signals 821 and 822 being in phase quadrature,
$A_{m1}A_{m2}$, represents the peak amplitues of the coupled energy generated modulation of the intensities of beams IW1 and IW2, respectively,
$(\theta_1 - \theta_2)$ represents the phase difference between the coupled energy generated modulations of the beam intensities at the beat frequency.

Using the relation for the intensities I1' and I2' shown in equation (9) and assuming that I1' is approximately equal to I2' for a sufficiently large beat frequency, $\omega_b$, and substituting these expressions in equation (2), the discriminant of the present invention can be mathematically described by:

$$(\dot{I}_1 + \dot{I}_2)^2 = \frac{\omega_b^2}{2} \{(A_{m1})^2 + (A_{m2})^2 + 2(A_{m1})(A_{m2})\cos(\theta_1 - \theta_2)\} \quad (15)$$

Equation (15) is the discriminant of present invention but which is squared. The form of equation (15) is identical to equation (14) showing that the output of the discriminant generator 320' is substantially the discriminant of the present invention defined by equation (2) and may be expressed as either $$D = \frac{\dot{I}_1}{I_1} + \frac{\dot{I}_2}{I_2} \quad (16a)$$

or $$D \approx \dot{I}_1 + \dot{I}_2 \quad (16b)$$

Both equation (16a) and (16b) represent the weighted vectorial sum of the coupled energy generated modulation of beams propagating about sensor 300. Thus, either expression is a useful discriminant indicative of sensor lock-in rate and/or scale factor linearity.

The path position control 330' shown in FIG. 8 is essentially the same as that shown in FIGS. 6 and 7 except that the peak detector 620 is no longer required since the output of the square root circuit 880 contains a DC term which varies at the discriminant dithering rate. The output of square root circuit 880 or the output of summing circuit 870 substantially represents the vectorial sum of the coupled energy generated modulations of each of the beam intensities. This vectorial sum is related to the weighted derivative sum of the intensities as indicated in equation (2). The DC term from the output of square root network 880 varies in amplitude at the discriminant dithering rate substantially determined by oscillator 630 in a manner as already described with reference to FIG. 6. Thus, the mirror surfaces of transducers 301 and 302 can be, as before, positioned in accordance with the output of integrator 650 as aforesaid.

The high signal-to-noise ratio discriminant generator 320' indicated in FIG. 8 is applicable to both non-biased and biased systems and, is applicable to constant biased or alternating biased systems. The specific embodiment shown in FIGS. 3, 6, 7, and 8 are illustrative of various techniques for obtaining information of the coupled energy generated modulations of the intensity of the counterpropagating beams for signal processing in order to determine the novel discriminant of the present invention. Further refinements of the discriminant itself and the implementation thereof are of course possible since only first and second order terms have been retained in the analysis.

Note that the discriminant generator 320' is further applicable to systems other than laser angular rate sensors and the like. The inventive concepts of discriminant generator 320' can be utilized to provide selected intensity information about a first wave propagating with a second wave in any type of waveguide providing that there exists a frequency difference between the waves. If any energy coupling exists between the two waves, the intensity of each of the waves will vary at the frequency difference between the waves. By practicing the principles of vectorial component summing described above with respect to discriminant generator 320', signals representative of intensity variations can be produced. Namely, by detecting the frequency difference between the waves and deriving a pair of reference signals at a frequency related thereto and in phase quadrature with each other, vectorial components can be generated by which the intensity variations can be determined. For example, to obtain intensity information about the first wave, (i) generate a first product of the intensity of the first wave and the inphase reference signal; (ii) generate a second product of the intensity of the first wave and the phase quadrature reference signal; and (iii) obtain a vectorial sum by summing the squares of the first and second products to provide the desired intensity information.

Figure 10:
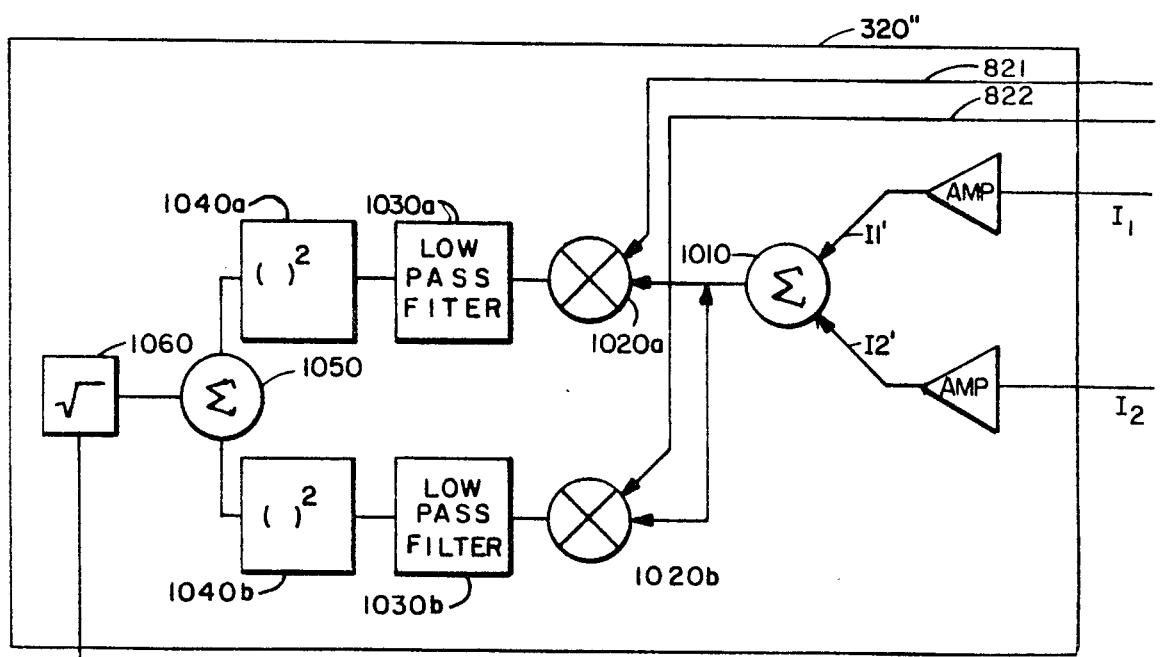
FIG. 10 is another embodiment of a discriminant generator similar to that shown in FIG. 9.

Note that the discriminant $(I_1+I_2)^2$ can be obtained in a variety of ways using the principles already described. Shown in FIG. 10 is an embodiment of a discriminant generator block 320" producing substantially the same discriminant output signal as discriminant generator 320'. In FIG. 10, the weighted vectorial sum of the coupled energy generated modulations are again derived from input signals I1 and I2 similar to FIG. 8. Best frequency reference signals 821 and 822, the reference signals in phase quadrature, are presented as inputs to discriminant genarator 320". Signals I1' and I2' are summed by summing circuit 1010, and the sum is presented to each of multipliers 1020a and 1020b. Multiplier 1020a forms a first product of the inphase reference signal 821 and the sum of I1' and I2'; multiplier 1020b forms a second product of the phase quadrature reference signal 822 and the sum of I1' and I2'. The output of multiplier 1020a is passed through a low pass filter 1030a and squared by squaring circuit 1040a. The output of multiplier 1020b is passed through a low pass filter 1030b and squared by squaring circuit 1040b. The outputs of circuits 1040a and 1040b are summed by summing circuit 1050, and the square root thereof is obtained by square root circuit 1060. The output of square root circuit is indicated by signal 881'.

Careful analysis of the discriminant generator 320" will show that the output thereof, 881', is exactly the same as the output 881 in FIG. 8. That is, the output of square root circuit 1060, the discriminant, has the mathematical form or equation (14).

The low pass filters shown in both FIG. 8 and FIG. 10 can be alternately arranged in a variety of ways to provide AC filtering as intended. For example, filters 1030a and 1030b in FIG. 10 could be eliminated and replaced by a single low pass filter (not shown) located in the signal path between summing circuit 1050 and square root circuit 1060 to achieve the desired filtering.

The embodiments shown in the present application have all been illustrated with a sensor having a closed-loop path in the form of a triangle. However, the invention of the present application is not limited in scope to such closed-loop paths since the principles of the invention are applicable to any type of closed-loop path made up of a series of connected line segments. For example, when a rectangular closed-loop path is provided for the counterpropagating waves, four reflective surfaces form the vertices of the closed-loop path. Moving the reflective surfaces of the diagonal pair perpendicular to the reflective surface thereof and in opposite sense would alter the lasing path by changing the positional relationship between the path followed by the counterpropagating beams relative to all of the reflective surface. Thus, the discriminant of the present invention and discriminant dithering can be applied as taught in the present invention to find an optimum position for the diagonal pair of mirrors to produce either minimum lock-in rate and/or to select optimized scale factor linearity.

There are, of course many ways of altering the closed-loop path traveled by the waves and/or the scattering at the reflective surfaces so as to affect the energy coupling between waves. Although the embodiments described above have been shown with reflective surfaces which are moved in a direction perpendicular to the reflective surface, any one wave reflecting surface be moved in translation or relation in order to alter the lasing path to a condition producing an optimum positional relationship of the path followed by the counterpropagating waves relative to the reflective surfaces minimizing lock-in and optimizing scale factor linearity. When practicing the invention, it is of course desirable to maintain a constant path length for maintaining a constant intensity of the waves propagating around the closed-loop path and, desirably, at maximum steady state intensity.

Although two transducers are used in the embodiments described above for dithering the positional relationship of the closed-loop path relative to the mirror surfaces, a single transducer would be all that is required. Further, one or more transducers could be used in various combinations with various types of closed-loop paths for obtaining optimum path position control using the discriminant of the present invention and embodiments thereof.

Although the invention is shown in combination with a laser angular rate sensor, the novel discriminant of the present invention is applicable to a variety of systems in which two propagating waves propagate about a closed-loop, and it is desired to produce a signal indicative of the coupling of one wave into the other for measurement or control purposes.

The implementation of the path position control and the discriminant generators shown in FIGS. 6, 7, 8, and 10, have been shown utilizing analog circuitry well known in the art. It is, of course, possible to implement such circuits using digital technology in combination with either software or firmware for implementation thereof through use of discrete digital circuit systems, computers, microprocessors and the like.

Although the invention has been shown and described with respect to the embodiments thereof, it should be understood by those skilled in the art that various changes and omissions in the form and detail thereof may be made therein without departing from the spirit and scope of the invention of the present application.

The embodiments of the invention in which an exclusive property or right is claimed are defined as follows:

1. A signalling apparatus for producing an output signal descriptive of a function of the variations in the intensity of a first wave of a first frequency propagating along a wave guide means, and coexisting with a second wave of a second frequency, wherein said intensity variations are due to coupling of energy from one wave into the other along said wave guide means, said signalling apparatus comprising:

intensity detection means, responsive to said first wave, for producing at least a first intensity signal indicative of the instantaneous intensity of said first wave;

frequency signal means, responsive to said first and second waves, for producing first and second reference signals in phase quadrature with each other and having a frequency value which is a function of substantially the instantaneous value of the frequency difference between said first and second waves;

first means for generating
  (i) a first product signal representative of the product of said first intensity signal and said first reference signal, and (ii) a second product signal representative of the product of said first intensity signal and said second reference signal; and second means for operating on said first and second product signals and producing an output signal representative of said intensity variations of said first wave.

2. The apparatus of claim 1 wherein said waves are in the form of laser beams and said laser beams travel in opposite directions along said waveguide means.

3. The apparatus of claim 2 wherein said waveguide means provides an optical closed-loop path substantially defined by at least three wave reflecting surfaces forming vertices of said closed-loop path, said surfaces capable of reflecting said laser beams about said closed-loop path.

4. The apparatus of claim 3 wherein said closed-loop path is in the shape of a triangle defined by said at least three wave reflective surfaces.

5. A signalling apparatus for producing an output signal descriptive of a function of the variations in the intensity of first and second waves, having first and second wave frequencies respectively, wherein said waves propagate and coexist along a wave guide means, wherein said intensity variations are due to coupling of energy from one wave into the other along said waveguide means, and wherein the intensity variation of each of said waves has an amplitude and there being a phase relationship established therebetween, said signalling apparatus comprising:

intensity detection means, responsive to said first and second waves, for producing first and second intensity signals indicative of the instantaneous intensity of said first and second waves respectively;

frequency signal means, responsive to said first and second waves, for producing first and second reference signals in phase quadrature with each other and having a frequency value which is a function of substantially the instantaneous value of the frequency difference between said first and second waves; and signal processing means for operating on said first and second intensity signals and said first and second reference signals and producing an output signal representative of a selected vectorial sum of said intensity variations of each of said waves, wherein said output signal is a function of said first and second intensity signals and first and second reference signals.

6. The apparatus of claim 5 wherein said signal processing means includes:

means for generating
(i) a first product signal representative of the product of said first intensity signal and said first reference signal,
(ii) a second product signal representative of the product of said first intensity signal and said second reference signal,
(iii) a third product signal representative of the product of said second intensity signal and said first reference signal, and
(iv) a fourth product signal representative of the product of said second intensity signal and said second reference signal;

first summing means for providing a first sum signal representative of the sum of said first and third product signals, and providing a second sum signal representative of the sum of said second and fourth product signals;

means for providing signals representative of the square of each of said first and second sum signals; and second summing means for providing said output signal as a function of the sum of said squared first sum signal and said squared second sum signal.

7. The apparatus of claim 6 wherein said waveguide means provides an optical closed-loop path substantially defined by at least three wave reflecting surfaces forming vertices of said closed-loop path.

8. The apparatus of claim 5 wherein said signal processing means includes:

first summing means for providing a first sum signal representative of the sum of said first and second intensity signals;

means for providing
(i) a first product signal representative of the product of said first sum signal and said first reference signal, and
(ii) a second product signal representative of the product of said first sum signal and said second reference signal;

means for providing signals representative of the square of each of said first and second product signals; and second summing means for providing said output signal as a function of the sum of said squared first and second product signals.

9. The apparatus of claim 8 wherein said closed-loop path is substantially defined by at least three wave reflecting surfaces forming vertices of said closed-loop path.

10. The apparatus of claim 5 wherein said waves propagate in opposite directions along said wave guide means having a closed-loop path.

11. The apparatus of claim 10 wherein said closed-loop path is substantially defined by at least three wave reflecting surfaces forming vertices of said closed-loop path.

12. In an angular rate sensor of the class wherein two waves propagate in opposite directions along a closed-loop path, each of said waves having an intensity associated therewith which includes intensity variations due to copuling of energy of each of said waves into the other along said closed-loop path, wherein the frequency of each of said waves is a function of the rate of rotation of said closed-loop path, and wherein associated with said sensor is a lock-in rotation rate, related to said coupling of energy below which said waves lock-in to substantially the same frequency, and wherein associated with said sensor is a rotation scale factor relating the frequency difference between said waves to the rotation of said closed-loop path, wherein the improvement comprises:

intensity detection means, responsive to said first and second waves, for producing first and second intensity signals indicative of the instantaneous intensity of said first and second waves respectively;

frequency signal means, responsive to said first and second waves, for producing first and second reference signals in phase quadrature with each other and having a frequency value which is a function of substantially the instantaneous value of the frequency difference between said first and second waves; and signal processing means for operating on said first and second intensity signals and said first and second reference signals and producing an output signal representative of said lock-in rate as a function of said first and second intensity signals and said first and second reference signals.

13. The apparatus of claims 12 wherein said frequency signal means includes:
means responsive to a portion of each of said first and second waves so as to establish an interference pattern;
means responsive to said interference pattern for providing an output signal indicative of the rate of change of said interference pattern.

14. The apparatus of claim 12 wherein said waves are electromagnetic waves in the form of laser beams, and said intensity detecting means includes a first photodetector responsive to a portion of one of said waves and producing said first intensity signal, and a second photodetector responsive to a portion of one of said waves opposite to that of said first photodetector, and producing said second intensity signal.

15. The apparatus of claim 12 wherein said signal processing means includes:
means for generating
(i) first product signal representative of the product of said first intensity signal and said first reference signal,
(ii) a second product signal representative of the product of said first intensity signal and said second reference signal,
(iii) a third product signal representative of the product of said second intensity signal and said first reference signal, and
(iv) a fourth product signal representative of the product of said second intensity signal and said second reference signal;
first summing means for providing a first sum signal representative of the sum of said first product signal and said third product signal, and providing a second sum signal representative of the sum of said second product signal and said fourth product signal;
means for providing signals representative of the square of each of said first and second sum signals; and
second summing means for providing said output signal as a function of the sum of said squared first sum signal and said squared second sum signal.

16. The apparatus of claim 12 wherein said signal processing means includes:
first summing means responsive to said first and second intensity signals for providing a first sum signal representative of the sum of said first and second intensity signals;
means for providing
(i) a first product signal representative of the product of said first sum signal and said first reference signal, and
(ii) a second product signal representative of the product of said first sum signal and said second reference signal;
means for providing signals representative of the square of each of said first and second product signals; and
second summing means for providing said output signal as a function of the sum of said squared first and second products.

17. The apparatus of claim 12 further comprising:
control means responsive to said output signal for altering said coupling of energy between said waves to a condition at which said lock-in rate of said sensor is substantially a minimum.

18. The apparatus of claim 12 further comprising:
control means responsive to said output signal for altering said coupling of energy between said waves to a condition at which said rotation scale factor is optimally linearized.

19. The apparatus of claims 12, 15, 16, 17 or 18 wherein said angular rate sensor includes a biasing means selected from the group consisting of rotating said closed-loop path at substantially a constant rate, oscillating said closed-loop path in a rotational mode back and forth, altering said waves so as to establish a substantially constant frequency difference therebetween, and altering said waves so as to establish a varying frequency difference between the frequency of each of said waves so that said frequency difference alternates in sign.

20. The apparatus of claims 12, 15, 16, 17 or 18 wherein said waves are in the form of laser beams, and wherein said intensity detecting means includes a first photodetector responsive to a portion of one of said laser beams for producing said first intensity signal, and a second photodetector responsive to a portion of the other of said laser beams for producing said second intensity signal.

21. The apparatus of claim 12 wherein said closed-loop path is a plurality of straight line segments including a plurality of reflective surfaces defining said closed-loop path, said improvement further comprising:
shifting means responsive to a control signal for varying the positional relationship between said closed-loop path and at least one of said reflective surfaces such that said coupling of energy between said waves is altered in response to said control signal; and
control means responsive to said output signal for generating said control signal such that said shifting means shifts and positional relationship to a condition at which said lock-in rate of said sensor is substantially a mimimum.

22. The apparatus of claim 21 wherein said angular rate sensor includes a biasing means capable of introducing a frequency bias in at least one of said waves so as to establish a frequency difference between the frequency of said waves such that said waves are prevented from locking in to a common frequency at rotation rates below said lock-in rate of rotation.

23. The apparatus of claim 22 wherein said closed-loop path is continuously rotated in a first direction to provide said bias.

24. The apparatus of claim 21 wherein said angular rate sensor includes a biasing means capable of introducing a varying frequency bias in at least one of said waves resulting in the rate of change of the frequency difference between said waves to pass through zero at least once.

25. The apparatus of claim 21 wherein said angular rate sensor includes means for oscillating said closed-loop path in a rotational mode, back and forth so as to provide a varying frequency difference between said waves.

26. The apparatus of claim 21 wherein said shifting means includes at least one transducer means adapted to receive a transducer control input signal, said at least one transducer having a reflective surface providing one of said plurality of reflective surfaces defining said closed-loop path, said at least one transducer means capable of affecting said positional relationship between said closed-loop path and any one of said plurality of reflective surfaces in response to said control signal.

27. The apparatus of claim 21 wherein said control means includes:
   path length control means for controlling the total path light of said closed-loop path so that the steady state intensity of said waves remains substantially constant.

28. The apparatus of claim 12 wherein said output signal maybe substantially subscribed by:

$$D \simeq \frac{\dot{I}_1}{I_1} + \frac{\dot{I}_2}{I_2}$$

where
   D is said signal related to the lock-in rate of rotation of said sensor;
   $I_1$ is said first intensity signal, and $\dot{I}_1$ is the first time derivative thereof; and
   $I_2$ is said second intensity signal, and $\dot{I}_2$ is the first time derivative thereof.

29. The apparatus of claim 15 wherein said output signal maybe substantially subscribed by:

$$D \simeq \frac{\dot{I}_1}{I_1} + \frac{\dot{I}_2}{I_2}$$

where
   D is said signal related to the lock-in rate of rotation of said sensor;
   $I_1$ is said first intensity signal, and $\dot{I}_1$ is the first time derivative thereof; and
   $I_2$ is said second intensity signal, and $\dot{I}_2$ is the first time derivative thereof.

30. The apparatus of claim 16 wherein said output signal maybe substantially subscribed by:

$$D \simeq \frac{\dot{I}_1}{I_1} + \frac{\dot{I}_2}{I_2}$$

where
   D is said signal related to the lock-in rate of rotation of said sensor;
   $I_1$ is said first intensity signal, and $\dot{I}_1$ is the first time derivative thereof; and
   $I_2$ is said second intensity signal, and $\dot{I}_2$ is the first time derivative thereof.

31. A method of producing an output signal related to the lock-in rate of a ring laser angular sensor wherein two waves propagate in opposite directions along a closed-loop path, each of said waves having an intensity associated therewith which includes intensity variations due to coupling of energy of each of said waves into the other along said closed-loop path, wherein the frequency of each of said waves is a function of the rate of rotation of said closed-loop path and wherein associated with said sensor is a lock-in rotation rate, related to said coupling of energy below which said waves lock into substantially the same frequency, the method comprising:
   generating first and second signals indicative of the intensity of said first and second waves respectively;
   generating first and second reference signals in phase quadrature with each other and having a frequency value which is a function of substantially the instantaneous value of the frequency difference between said first and second waves;
   operating on said first and second signals to produce
      (i) a first product representative of the product of said first signal and said first reference signal,
      (ii) a second product representative of the product of said first signal and said second reference signal,
      (iii) a third product representative of the product of said second signal and said first reference signal, and
      (iv) a fourth product representative of the product of said second signal and said second reference signal;
   generating a first sum signal representative of the sum of said first product and said third product, and a second sum signal representative of the sum of said second product and said fourth product;
   generating said output signal as a function of the sum of the squared value of said first sum signal and the squared value of said second sum signal.

32. A method of producing an output signal related to the lock-in rate of a ring laser angular sensor wherein two waves propagate in opposite directions along a closed-loop path, each of said waves having an intensity associated therewith which includes intensity variations due to coupling of energy of each of said waves into the other along said closed-loop path, wherein the frequency of each of said waves is a function of the rate of rotation of said closed-loop path and wherein associated with said sensor is a lock-in rotation rate, related to said coupling of energy below which said waves lock into substantially the same frequency, the method comprising:
   generating first and second signals indicative of the intensity of said first and second waves respectively;
   generating first and second reference signals in phase quadrature with each other and having a frequency value which is a function of substantially the instantaneous value of the frequency difference between said first and second waves;
   summing said first and second signals for providing a first sum signal representative of the sum of said first and second signals;
   generating
      (i) a first product representative of the product of said first sum signal and said first reference signal, and
      (ii) a second product representative of the product of said first sum signal and said second reference signal;
   generating said output signal as a function of the sum of the squared value of said first product and the squared value of said second product.

* * * * *